(12) United States Patent
Iftkhar

(10) Patent No.: US 11,253,809 B2
(45) Date of Patent: Feb. 22, 2022

(54) FLEXIBLE PANEL AND SEALABLE BAG WITH SORBENT

(71) Applicant: STASIS LMPS LIMITED, Glasgow (GB)

(72) Inventor: Mohammed Rashid Iftkhar, Minerva Way Glasgow (GB)

(73) Assignee: STASIS LMPS LIMITED, Glasgow (GB)

( * ) Notice: Subject to any disclaimer, the term of this patent is extended or adjusted under 35 U.S.C. 154(b) by 432 days.

(21) Appl. No.: 16/519,522

(22) Filed: Jul. 23, 2019

(65) Prior Publication Data

US 2019/0344210 A1 Nov. 14, 2019

Related U.S. Application Data

(62) Division of application No. 15/113,996, filed as application No. PCT/GB2015/050166 on Jan. 23, 2015, now abandoned.
(Continued)

(51) Int. Cl.
*B01D 53/02* (2006.01)
*B01D 53/04* (2006.01)
(Continued)

(52) U.S. Cl.
CPC ............ *B01D 53/0407* (2013.01); *B32B 3/26* (2013.01); *F26B 5/16* (2013.01);
(Continued)

(58) Field of Classification Search
CPC ...... B01D 2257/104; B01D 2257/2045; B01D 2257/80; B01D 2257/90; B01D 53/0407;
(Continued)

(56) References Cited

U.S. PATENT DOCUMENTS 4,081,397 A * 3/1978 Booe ................... C09K 3/1021
252/194
4,119,195 A 10/1978 Widener
(Continued)

FOREIGN PATENT DOCUMENTS

EP 0151489 8/1985
FR 2665890 2/1992
(Continued)

OTHER PUBLICATIONS

International Search Report for PCT/GB2015/050166, Completed by the European Patent Office dated Jun. 4, 2015, 7 Pages.
(Continued)

*Primary Examiner* — Christopher P Jones
(74) *Attorney, Agent, or Firm* — Brooks Kushman P. C.

(57) ABSTRACT

A flexible panel in a sealable bag for disaster recovery has permeable inner layers and an impermeable outer layer affixed together so as to provide a plurality of cavities for receiving sorbent material. The cavities are arranged in a pattern across the flexible panel. A port is shown extending through all of the layers of the flexible panel. The port is used for introducing into and removing gas and/or liquid from the bag. The flexible panel may have one or more electronic components operable to monitor or control the chemical environment in the bag. The components may be affixed or printed on internal layers of the bag, such as: a conductor, a heater, a processor, a communications transmitter, a communications receiver and a GPS receiver. A remote module in electrical and/or wireless communication with the bag is operable to monitor and control the chemical environment in the bag.

5 Claims, 14 Drawing Sheets

Related U.S. Application Data

(60) Provisional application No. 61/930,670, filed on Jan. 23, 2014.

(51) Int. Cl.
*F26B 5/16* (2006.01)
*B32B 3/26* (2006.01)

(52) U.S. Cl.
CPC .................. *B01D 2257/104* (2013.01); *B01D 2257/2045* (2013.01); *B01D 2257/80* (2013.01); *B01D 2257/90* (2013.01); *B32B 2307/724* (2013.01); *B32B 2307/7242* (2013.01); *B32B 2307/74* (2013.01); *B32B 2307/758* (2013.01); *B32B 2439/46* (2013.01)

(58) Field of Classification Search
CPC ...... C32C 2307/724; C32C 2307/7242; C32C 2307/74; C32C 2307/758; B32B 2307/758; B32B 2439/46; B32B 3/26; F26B 5/16
See application file for complete search history.

(56) References Cited

U.S. PATENT DOCUMENTS

| | | | | |
|---|---|---|---|---|
| 4,463,847 | A * | 8/1984 | Gordon | F41C 33/06 206/205 |
| 4,657,133 | A * | 4/1987 | Komatsu | B65D 75/26 206/204 |
| 4,813,791 | A * | 3/1989 | Cullen | B65D 77/06 206/204 |
| 5,035,805 | A * | 7/1991 | Freeman | B01D 17/0202 210/689 |
| 5,091,229 | A * | 2/1992 | Golike | H01L 23/552 428/35.2 |
| 5,224,373 | A * | 7/1993 | Williams | G01N 31/222 73/29.02 |
| 5,293,996 | A | 3/1994 | Duncan | |
| 5,415,907 | A | 5/1995 | Inpue | |
| 5,739,463 | A | 4/1998 | Diaz et al. | |
| 5,875,892 | A | 3/1999 | Martin et al. | |
| 6,376,034 | B1 | 4/2002 | Brander | |
| 6,740,145 | B2 * | 5/2004 | Boroson | H01L 23/26 96/108 |
| 7,743,642 | B2 * | 6/2010 | Chiba | B32B 27/32 73/29.04 |
| 8,127,761 | B2 * | 3/2012 | Belluzzi | A61M 16/1065 128/202.22 |
| 9,428,317 | B2 * | 8/2016 | Kranz | B65D 77/06 |
| 9,675,723 | B2 * | 6/2017 | Chew | B32B 27/32 |
| 2001/0015327 | A1 | 8/2001 | Kitamura et al. | |
| 2003/0108646 | A1 | 6/2003 | O'Connor et al. | |
| 2003/0140923 | A1 | 7/2003 | Taylor | |
| 2004/0054331 | A1 | 3/2004 | Hamilton | |
| 2009/0013760 | A1 * | 1/2009 | Chiba | B32B 15/085 73/29.04 |
| 2009/0145783 | A1 * | 6/2009 | Forker | F26B 9/006 206/204 |
| 2009/0267761 | A1 | 10/2009 | Georgescu et al. | |
| 2012/0061261 | A1 * | 3/2012 | Hsu | F24F 3/1411 206/204 |
| 2013/0098783 | A1 * | 4/2013 | Hernandez | F26B 21/083 206/204 |
| 2020/0315220 | A1 * | 10/2020 | Tewari | B65B 31/044 |

FOREIGN PATENT DOCUMENTS

| | | |
|---|---|---|
| GB | 2350347 | 11/2000 |
| JP | H02286778 | 11/1990 |
| JP | H05178384 | 7/1993 |
| JP | H1014633 | 1/1998 |
| JP | H10250774 | 9/1998 |
| JP | 2001198429 | 7/2001 |
| JP | 2006021124 A | 1/2006 |
| JP | 2009040440 | 2/2009 |
| WO | 9832661 | 7/1998 |

OTHER PUBLICATIONS

NPL Bheestie Bag (Year: 2011).
Maeoka 2001198429 Machine Translation (Year:2001).
Mihara 2006021124 Machine Translation (Year:2006).
Tanaka H1014633 Machine Translation (Year: 1998).

* cited by examiner

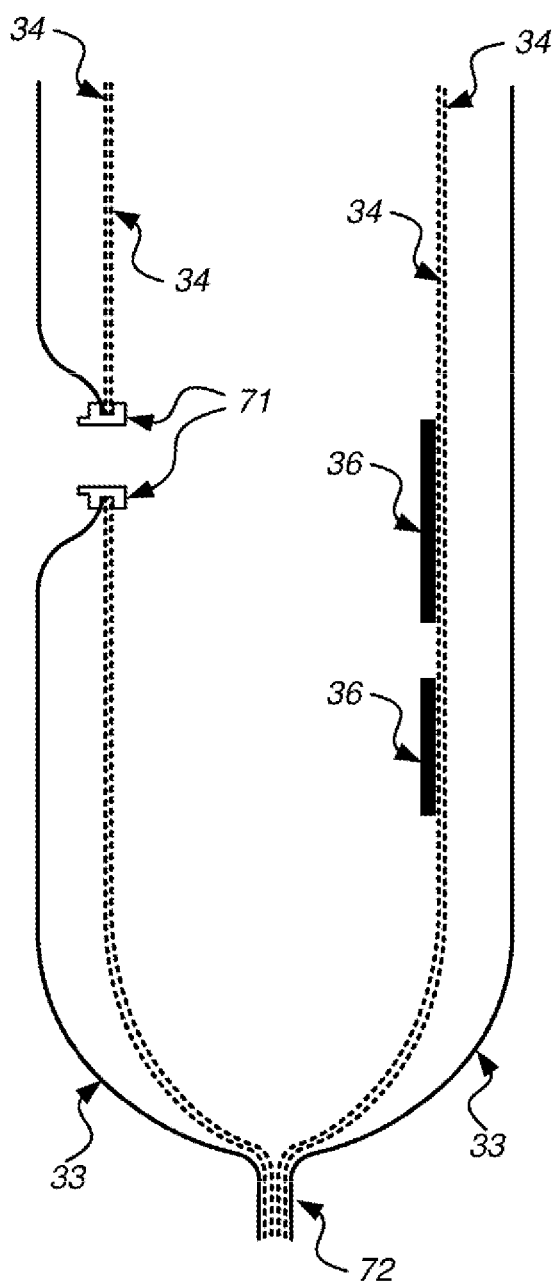
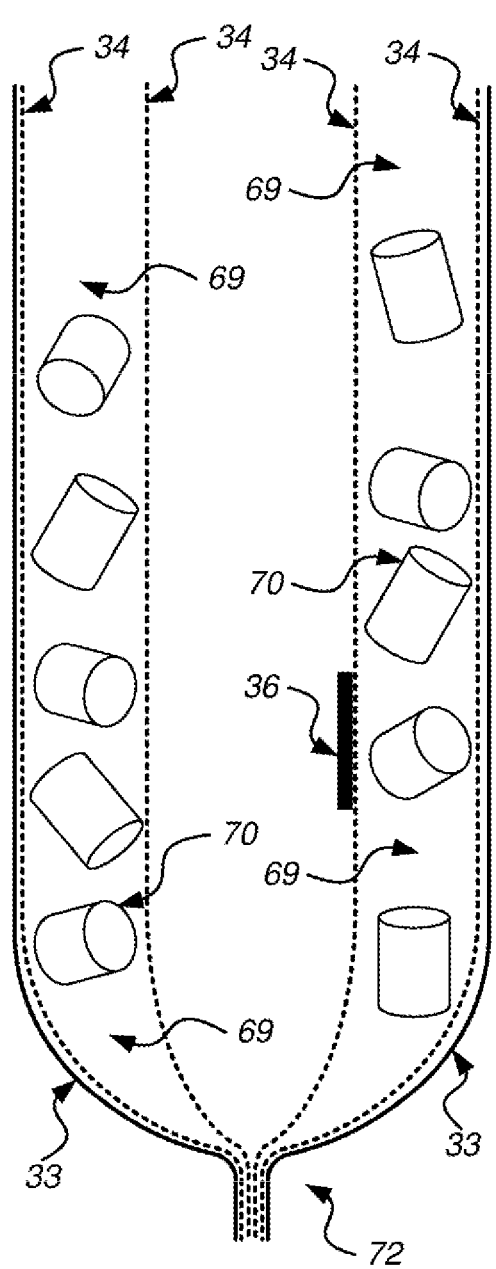
Fig. 3A
Fig. 3B

FLEXIBLE PANEL AND SEALABLE BAG WITH SORBENT

CROSS-REFERENCE TO RELATED APPLICATIONS

This application is a Divisional application of the Ser. No. 15/113,996 filed Jul. 25, 2016 which is the U.S. national phase of PCT application No. PCT/GB2015/050166 filed on Jan. 23, 2015, which the benefit of U.S. Provisional application No. 61/930,670 filed on Jan. 23, 2014, the disclosures of which are incorporated in their entirety by reference herein.

TECHNICAL FIELD

The present invention relates to a flexible panel for use in a sealable bag, a sealable bag and a sealed tablet for use with sorbent material, such as oxygen and moisture absorbers and odor adsorbers. The present invention also relates to a method of preserving an item, a sealable disaster recovery bag and a disaster recovery system. The bags may be used for example for fire and flood disaster recovery of electronics equipment, protection of artistic works or preventive protection of household items in the event of a flood.

BACKGROUND

Following a fire or a flood, humidity levels can rapidly rise and corrosive environments can manifest. If metallic surfaces and sensitive electronic equipment are left exposed in this environment, they can become prone to corrosion.

Immediately following a fire or flood, there is an opportunity for restoration of electronic equipment. Such restoration can be highly effective, however this option has time constraints; the restoration must be done quickly. As this time-restricted window of opportunity subsides, the opportunity for economic restoration becomes less likely. As each hour passes the extent of the damage increases. A damage assessment of fire or flood damaged equipment inspected on day one of the incident may indicate that the equipment is salvageable. However, this may no longer be the case on day two. This is a huge problem for all concerned.

Dehumidifiers can be used to reduce moisture levels from whole rooms or buildings, but only water and/or water vapor is removed and the timescale is too long to prevent irrecoverable damage to electronic equipment. Furthermore, in a major flood incident, there can be a scarcity of dehumidifying plant across the whole region affected. Also dehumidifiers and in particular desiccant dehumidifiers can cause Electrostatic Discharge (ESD) problems.

With finite resources given to the restoration effort, even prioritizing which equipment to start with takes up valuable time.

Problems exist when using drying agents including sodium, potassium and magnesium in a confined enclosure, on contact with various organic substances. Furthermore, fire or flood damaged equipment poses a hazard which can exacerbate the risks. Unlike uncontaminated equipment, fire and flood damaged items have to be treated with caution as a chemically or biologically active film may exist on the surface of the equipment.

A known approach to providing a controlled local environment to halt the degradation of electronic equipment that has been subjected to fire or flood is to use a sealable bag.

UK patent GB2350347 in the name of the applicant discloses a bag for storage of items in a controlled environment. The bag is intended for preserving items such as electrical goods placed therein from corrosion, especially following a fire or flood. The plastic bag is lined with oxidation arrest paper and has a mouth closeable by a strip seal. Valve means in the bag wall may comprise a locking inlet valve through which a moisture displacer may be pumped in, and a locking outlet valve through which air can be extracted from the bag. The bag may contain a humidity indicator card and also contain a desiccant such as silica gel.

A problem with this is that the oxygen absorber is not separated from the electrical equipment in the bag, so it can become damaged and can itself contaminate the electrical equipment.

U.S. Pat. No. 5,739,463 in the name of Raychem Corporation discloses sealed electronics packaging for the environmental protection of active electronic circuit boards and the like assemblies. An envelope has walls of a laminate material. The particular sheet material comprises top and bottom layers of a suitable material such as low density polyethylene about 200 microns thick and two interior layers about 80 microns thick of cast polyamide or polyester and a central layer of about 20 microns thick of aluminum or other suitable material. A problem of sharp points extending from the active electronics and puncturing the sheet material was addressed by surrounding the active electronics with an extruded plastic mesh tube with large holes, plastic foam, fish paper, or paper containing desiccant materials. After an electrical connector is engaged a packet of desiccant/scavenger is inserted into the open end of the packaging and the back edge is sealed using a simple heat sealing machine.

Japanese patent application JP2009040440A in the name of Dainippon Printing Co Ltd discloses an oxygen and moisture absorbing pouch, which uses a moisture absorbing laminated body and an oxygen absorbing laminated body. The moisture absorbing laminated body (a) consists of a moisture absorbing nonwoven fabric using a resin carrying a substrate film (i), a barrier thin film layer (ii) and a drying agent (iii). The oxygen absorbing laminated body (b) consists of an oxygen absorbing resin film comprising a resin composition comprising a substrate film (i), a barrier thin film layer (ii) and an oxidative resin (iii) or the like. The bag (c) is manufactured so that the nonwoven fabric of the moisture absorbing laminated body (a) and the oxygen absorbing resin film of the oxygen absorbing laminated body (b) face each other.

A problem with this is that the laminate is relatively expensive to manufacture. Furthermore, it does not provide oxygen absorbing and moisture absorbing materials on the same wall of the bag. Therefore the oxygen and moisture absorbing functions do not fully surround the electronic equipment.

Another approach is using packets of desiccant/scavenger. The packets are localized in one part of the bag. Therefore the oxygen and moisture absorbing functions do not fully surround the electronic equipment. Furthermore, packets of desiccant/scavenger can slip to the bottom of the bag, ending up in a pool of water, thus saturating them.

Another problem is that if the bags have different sizes, the then the user would have to calculate or follow instructions to determine how many packets or what size of packet should be added in order to put in the correct amount of absorbing material.

When using packets of desiccant/scavenger added at the time of use, the user has to keep a separate supply of packets of desiccant/scavenger.

If the bags are loaded with packets during manufacture, then they could fall out.

SUMMARY

It is an object of aspects of the present invention to overcome at least some of the problems identified above.

According to a first aspect of the present invention there is provided a flexible panel for use in a sealable bag having inner and outer layers, the flexible panel comprising at least one permeable inner layer and an impermeable outer layer affixed together so as to provide a plurality of cavities for receiving sorbent material, the cavities being arranged in a pattern across the flexible panel.

Preferably, the flexible panel further comprises an impermeable inner layer affixed to the impermeable outer layer and disposed on the opposite side of the at least one permeable inner layer from the impermeable outer layer, wherein the impermeable inner layer is configurable in use to separate the cavities from contents of the sealable bag and is manually rupturable in use to expose the cavities to the contents of the sealable bag.

Preferably, the impermeable inner layer is manually detachable in use from the impermeable outer layer to expose the cavities to the contents of the sealable bag.

Preferably, the impermeable outer layer comprises an aperture for manual rupturing of the impermeable inner layer in use to expose the cavities to the contents of the sealable bag.

Preferably, the impermeable outer layer is provided with at least one first adhesive seal around the aperture and the impermeable inner layer is removably adhered to the at least one first adhesive seal to seal the aperture of the impermeable outer layer.

Preferably, the impermeable outer layer is provided with a second adhesive seal configurable to seal the aperture of the impermeable outer layer after removal of the impermeable inner layer from the at least one first adhesive seal.

Preferably, the flexible panel further comprises sorbent material contained in a plurality of the cavities.

Preferably, the sorbent material comprises at least one sorbent selected from the group: moisture absorbing material, oxygen absorbing material and odor adsorbing material.

Preferably, the flexible panel further comprises biological activity retardant material contained in a plurality of the cavities.

Preferably, at least one permeable inner layer is configured to provide a plurality of channels.

Preferably, at least some of the channels are interconnected.

Preferably, at least some of the channels are configured to radiate from a port in the outer impermeable layer.

Preferably, the flexible panel further comprises tubes arranged in the channels configured to wick moisture along the channels by capillary action.

Preferably, the flexible panel further comprises tie rods between a pair of layers in the flexible panel, the tie rods configured to be collapsible in use responsive to a pressure difference across the layers of the flexible panel.

Preferably, the flexible panel comprises a plurality of permeable layers with differing pore sizes configured to separate different gasses and or liquids into different respective cavities bounded by the permeable layers with differing pore sizes.

Preferably, the flexible panel flexible further comprises one or more electronic components operable to monitor or control a chemical environment in a bag.

Preferably, the components are printed onto a layer of the flexible panel.

Preferably, the components comprise one or more components selected from the group: a sensor, a conductor, a heater, a processor, a communications transmitter, a communications receiver and a GPS receiver.

Preferably, the flexible panel further comprises a flow-regulating outlet port through the outer impermeable layer.

Preferably, the flexible panel further comprises an anti-static port through the outer impermeable layer.

Preferably, the flexible panel further comprises a condensation release valve in fluid communication with a port through the outer impermeable layer.

Preferably, the flexible panel further comprises a thermoplastic tongue member or a thermoplastic groove member of a heat sealable tongue and groove closure.

According to a second aspect of the present invention, there is provided a sealable bag comprising at least one flexible panel according to the first aspect.

According to a third aspect of the present invention, there is provided a sealable bag apparatus comprising the sealable bag of the second aspect and a sealed tablet comprising an outer manually-breakable seal layer surrounding a moisture absorber portion and an oxygen absorber portion.

Preferably, the sealable bag apparatus further comprises a self-heating portion surrounded by the seal layer.

Preferably, the portions are arranged concentrically.

According to a fourth aspect of the present invention, there is provided a sealed tablet comprising an outer manually-breakable seal layer surrounding a moisture absorber portion and an oxygen absorber portion.

Preferably, the sealed tablet further comprises a self-heating portion surrounded by the seal layer.

Preferably, the portions are arranged concentrically.

According to a fifth aspect of the present invention, there is provided a method of preserving an item, the method comprising the steps of:

providing a sealable bag comprising at least one flexible panel comprising at least one permeable inner layer and an impermeable outer layer affixed together so as to provide a plurality of cavities, the cavities being arranged in a pattern across the flexible panel, a plurality of the cavities containing sorbent material, and wherein the flexible panel further comprises an impermeable inner layer affixed to the impermeable outer layer and disposed on the opposite side of the at least one permeable inner layer from the impermeable outer layer, wherein the impermeable inner layer separates the cavities from contents of the sealable bag;

inserting an item to be preserved in the sealable bag;

sealing the bag;

introducing pacifying gas into the bag; and manually rupturing the impermeable inner layer to expose the cavities to the item in the sealed bag.

Preferably, the step of manually rupturing the impermeable inner layer comprises manually detaching the impermeable inner layer from the impermeable outer layer to expose the cavities to the item in the sealed bag.

Preferably, the method of preserving an item further comprises the step of providing an aperture in the impermeable outer layer, and wherein the step of manually rupturing the impermeable inner layer uses the aperture.

Preferably, the method of preserving an item further comprises the steps of:

providing the impermeable outer layer with at least one first adhesive seal around the aperture;

removably adhering the impermeable inner layer to the at least one first adhesive seal to seal the aperture of the impermeable outer layer; and manually rupturing the impermeable inner layer by manually detaching the impermeable inner layer from the first adhesive seal and pulling the impermeable inner layer out of the bag through the aperture.

Preferably, the method of preserving an item further comprises the steps of:

providing the impermeable outer layer with a second adhesive seal; and sealing the aperture of the impermeable outer layer using the second adhesive seal after pulling the impermeable inner layer out of the bag through the aperture.

According to a sixth aspect of the present invention, there is provided a sealable disaster recovery bag comprising a flexible panel comprising one or more electronic components operable to monitor or control a chemical environment in the bag.

Preferably, the components are printed onto an internal layer of the flexible panel.

Preferably, the components comprise one or more components selected from the group: a sensor, a conductor, a heater, a processor, a communications transmitter, a communications receiver and a GPS receiver.

According to a seventh aspect of the present invention, there is provided a disaster recovery system comprising the sealable disaster recovery bag of the fifth aspect, the system further comprising a remote module in electrical and/or wireless communication with the sealable disaster recovery bag, wherein the remote module is operable to monitor the chemical environment in the sealable disaster recovery bag.

Preferably, the remote module is further operable to control the chemical environment in the sealable disaster recovery bag.

BRIEF DESCRIPTION OF THE DRAWINGS

Embodiments of the present invention will now be described by way of example only with reference to the following drawings:

FIGS. 3A and 3B illustrate, in schematic form, cross sections of the bag shown in FIG. 2C, in accordance with an embodiment of the present invention.

FIGS. 18A and 18B illustrate, in schematic form, cross sections of the bag shown in FIGS. 17A and 17B, having been sealed with an item inserted, and pacifying gas being pumped in.

DETAILED DESCRIPTION

Figure 1:
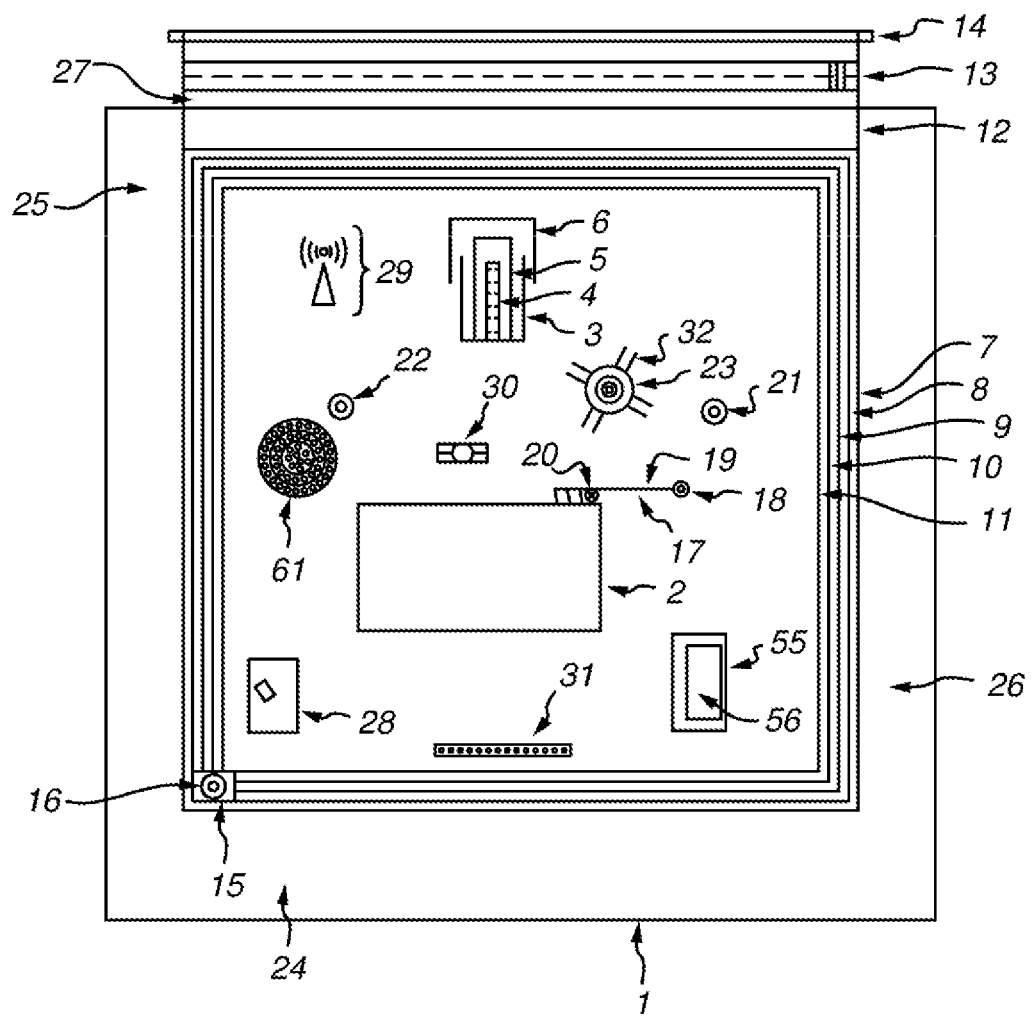
FIG. 1 illustrates, in schematic form, a bag having various features in accordance with embodiments of the present invention.

Examples described herein takes in to consideration the mixed chemical reaction that can take place, subsequently enhancing chemical actions and reactions to get the desired effect in addition to allowing for exhaust, collection and control of unwanted by products, through an active working enclosure comprising flexible panels.

Drying agents tend to clump during the water absorption process, disintegrate or form a syrupy layer. The approach described herein tackles this problem by containing sorbents in cavities.

Examples described herein provide chemical delivery and contamination recovery carried out in an encapsulated device with the integrated option of sensor and microprocessor technology.

Examples described herein relate to a multifunction device that actively prevents the onset of corrosion, retards biological activity, recovers excess moisture, neutralizes acidic residue, and combats oxidizing chemical agents which are not limited to members of the chalcogen group on the periodic table. This approach is applied to, but not limited to, electronic equipment following and not limited to incidents such as fires or pre and post disaster flooding.

This bag device having flexible panels works in low moisture environments and high moisture environments.

Examples described herein have the optional functionality allowing for selective interchangeable layer option to be used based on individual requirements.

This allows for the option to use single or multi-layer configuration of the optional layers in combination or singly, using nano films, membrane configuration units, nano printed sensor films, oxygen and moisture retarding materials embedded into the film, ESD film, heating film, impact absorber sheet, external electronics controller module, monitoring sensors embedded material, custom build interlocking layers, multifunction sensor embedded material, gas removal filtration system, constant vacuum pull system, IP67 protection compliant sealing outer material, specially designed vacuum pull and channelled moisture and gas path ways, allowing for simultaneous recovery and processing of more than one contamination stream.

The ports and components can be configured and can be interchanged at manufacturing stage. Sensors can also be placed on to alternative layers at manufacturing stage.

Examples described herein help to solve the problem of occupational exposure (secondary contamination) of restoration and insurance personal, from exposure to off gassing of smoke damaged items. Such bag devices retard corrosion without destroying the items placed inside the device.

Examples described herein help to solve the problem of occupational exposure of restoration and insurance personal from water damaged items. Such bag devices retard biological activity without destroying the items placed inside the device.

More elaborate examples of the bag may carry out real-time management with constant monitoring through smart sensors, printed directly onto a flexible layer surface using organic and printed electronics technology and communication systems.

Unlike a vacuum bag, examples described herein provide an active working enclosure, which can be adjusted to change the environment, limiting gaseous by-products, exchanging air, and removing condensation.

Acronyms used in the description are defined below:
ESD: Electrostatic discharge.
$H_2O$: The molecular formula for water.
Lipo: Lithium Polymer battery a type of rechargeable battery.
GPS: Global positioning system.
IP67: Ingress Protection from dust and protected against immersion.
PCB: printed circuit board.
EEPROM: read/write internal memory of an MCU.
Fogger: A device that spreads a chemical in the form of fog.
HCL: Hydrochloric acid.
FIG. 1 illustrates the following features:
1: Multifunction—Electronics pre and post disaster recovery device, comprising a bag having one or more flexible panels as its walls.
2: Contaminated item to be protected, placed inside the device.
3: Manual moisture indicator card pouch.
4: Manual moisture indicator card.
5: Manual moisture indicator card pull out activator tab.
6: Manual moisture indicator card self-seal flap over airtight seal.
7: Multi-layer sandwich configuration with one layer use or multi-layer use option can be deployed.
8: Multi-layer sandwich configuration with one layer used or multi-layer use option can be deployed.
9: Multi-layer sandwich configuration with one layer used or multi-layer use option can be deployed.
10: Multi-layer sandwich configuration with one layer used or multi-layer use option can be deployed.
11: Multi-layer sandwich configuration with one layer used or multi-layer use option can be deployed.
12: Thermal seal lip on the open end of the enclosure for heat sealing airtight.
13: Zip lock seal on the open end of the enclosure for slide zip closure option.
14: Strip and rod insert type seal on the open end of the enclosure.
15: Particulate filter for filtration and outlet exhaust of gases produced within the enclosure.
16: Particulate filter open and close valve.
17: ESD internal enclosure feature (connects to the equipment placed inside the enclosure).
18: ESD external 10 mm male stud (for connection to ESD grounding plug).
19: ESD internal flex connecting lead.
20: ESD internal connecter (connects to the item placed inside).
21: Fully sealed antistatic inlet valve, allows for gas to be pumped in externally to the closed enclosure.
22: Fully sealed antistatic regulated outlet valve, allows for the gas within the enclosure to be removed under control after the penetration time is complete. Also allows for the air to be removed aiding in the air tight enclosure.
23: 360° vacuum pull valve, allows for the inner enclosure to be vacuumed.
24, 25, 26 and 27: Vacuum sealable sides—aids interlocking feature, custom builds and IP67 protection.
28: ionize air gun port, allows for an ionize gun to be connected from external port to help dissipate static charges.
29: Optional wireless feature.
30: Optional condensation release valve.
31: Electronics connecter.
32: Vacuum pull lines, spread across the layers to help 360° vacuum pull, which is extracting gas from all radial directions in the bag towards the outlet port.
55: Optional manual heat activator pouch.
56: Optional manual heat activator packet.

Electronic equipment may be rescued through this active working enclosure resulting in protection from further contamination and degradation of the equipment, due to the threat or possibility of corrosive contamination penetrating the equipment.

Examples described herein prevent cross contamination by the potentially contaminated items being protected within the enclosure.

Examples described herein prevent occupational exposure by the potentially contaminated items being protected within the enclosure.

Examples described herein prevent the spread of viruses, mould spores, asbestos fibres and other hazardous substances/material by the potentially contaminated items being protected within the enclosure Examples described herein allow an ingress rating of (IP67) protecting electronics in the enclosure from outside environmental conditions as well as preventing water ingress in to the sealed enclosure.

ESD material may be integrated into the material of the flexible panel. The flexible panel of the bag wall may have conductive tracks (for example contact strips) affixed to or embedded in it.

The conductive tracks may be connected to an ESD external 10 mm male stud 18, for connection to ESD grounding strap or for static discharge by a handheld static discharge device.

The conductive tracks may be connected to an internal card (such as the computer 38 with the entire processor being the size of a SD card) that is additionally provided with an ESD removal chip.

The conductive tracks may be connected via the electronics connector 31 to an external module (such as the electronics controller module externally mounted outside of the bag) that is additionally provided with an ESD removal chip.

Nitrogen may be used to re-inflate the enclosure and for air exchange benefits.

This device uses puncture-resistant materials. The flexible panels of the bag may be made of layers of a plastic such as polyethylene (PE). This has the advantage that the layers may be heat sealed together. Thicker gauge polyethylene terephthalate (PET) may also be suitable and may be more puncture-resistant.

Examples described herein provide ridges or tubes (FIG. 1, 32) that radiate from the vacuum pull valve (FIG. 1, 23). This allows for 360° vacuum pull.

The air release valve feature, allows for gas to be sucked in along the whole ridged pathways, which travels across the surface. This feature allows for the release of trapped air. This feature also allows for moisture movement to happen in order for the extraction to be more effective.

Examples described herein provide internal heating means. This approach allows for bags to incorporate thermal functions to encourage vaporization of sitting water from the item placed inside the enclosure aided by the optional heat activator 55 by exposing the heat activator to the open bag enclosure.

The sitting water is warmed up by heat generating material or layers. The increase in temperature encourages vaporization of liquid to gas which is absorbed by the moisture absorbing material more easily. The kinetic energy from the heating provides better mass transport of gas within the bag and can also increase the efficiency of the sorption. The device can be used in conjunction with a specific heat calculator for exact amount of formulation. External heat trays can be placed outside of the device aiding temperature settings. The temperature inside the enclosure is measured by either an infra-red thermometer or sensors, this measurement along with the mass will give an idea of how much formulation needs to be added.

Examples described herein provide internal GPS/messaging means for remote monitoring, control and notifications. Examples described herein incorporate a GPS tracking feature that is operational in real-time. Examples described herein incorporate a security and tamper feature that is operational in real-time.

A regulated outlet functional to prevent damage to equipment being protected by too fast air flow (static) or impulse from deflating bag. Inlet and outlet ports are anti-static to reduce static build up in use.

Relative humidity should be kept within acceptable limits to avoid susceptibility to static charge build up and ESD damage. The desiccant can cause such problems by lowering the relative humidity below 10%. One way to avoid this problem is by using desiccants calibrated and specified to only bring the relative humidity down to a certain level. In terms of reducing damage to the equipment in the bag, a relative humidity of 37% or less is desirable. Therefore it is preferable to provide a relative humidity within the range preferably with a lower limit of 11-12% and a higher limit of 37%. The electronic monitoring and control functions described herein may use this range for control limits. The heating elements described herein may be used for automatic control of relative humidity in the bag.

With reference to FIG. 1, nitrogen or a specially formulated pacifying gas is pumped in through the external inlet valve 21 for example by means of a thermo fogger.

The pacifying gas may be provided in two formulas. One formula of the pacifying gas is to be used after fires in order to retard the negative effects of the smoke damage on the equipment which is placed inside the enclosure for treatment and protection. The second formula of the pacifying gas is used pre- and post-flooding in order to retard the biological activity and other negative effects on the equipment, which is placed inside the enclosure for treatment and protection.

The gas particles are able to penetrate beneath components on circuit board without the need for dismantle the equipment being placed inside the enclosure, the gas has good adhesion properties when used inside the enclosure. Furthermore the enclosure helps the gas to create an even coating on the equipment.

The gas stays in the sealed enclosure for a period of time, such as 5 to 20 minutes. After such time it is sucked out by means of a wet vacuum device through the outlet valve 22.

Thus, after a period of dwell time, the gas is removed from the enclosure using a chemical filtered wet vac through the regulated outlet valve 22. The flow regulated outlet valve serves several purposes including preventing the electronics components from becoming loosened due to the forces placed on them ordinarily in cases of unregulated air removal.

As the gas is being removed some of the air is also removed under antistatic conditions provided by the antistatic features described herein.

Then an antistatic vacuum device capable of handling moisture is connected to the vacuum pull valve 23. The enclosure is then vacuumed, again flow-regulated preventing the electronics components from becoming loosened due to the forces placed on them ordinarily in cases of unregulated vacuum removal.

The device can be used with liquid friendly vacuum chamber unit convenient for puling liquids without damaging the vacuum device.

The equipment placed inside the device is now encapsulated in this active working enclosure and is constantly treated by means of, but not limited to, activated ingredients as described herein. Furthermore, another feature of this bag device is its ability to being able to process and exhaust the produced gases and modify the environmental conditions within the internal enclosure without having to open the bag device fully.

The bag is able to process and or exhaust and or filter the by-products produced as a result of the item placed in the device. In addition the approach allows for the option of air exchange and condensation removal. The air exchange can be done with, but not limited to, nitrogen introduced into the device.

This approach has embedded fully sealed antistatic inlet port through which anti corrosive agent/gas can be pumped in under ESD control This approach has embedded fully sealed antistatic inlet port through which nitrogen can be pumped in under ESD control.

This approach has embedded fully sealed antistatic in let port through which antimicrobial agent and relevant decontamination agent's dependent on contamination can be pumped in under ESD control.

This method of pumping in gases allows for the device to be coated and protected without dismantling the equipment/item placed in it.

Regulated constant vacuum pull can be applied via the vacuum pull valve 23 with the additional purpose of addressing vacuum leaks.

This vacuum pull valve 23 allows for a constant vacuum pull to be applied, unlike other vacuum seal type bags, which can only be vacuumed one time, and then it is heat sealed shut. This feature allows for the vacuum to be applied after the heat sealing is done and at any time whilst the equipment is in the device.

Nitrogen or a specially formulated gas is pumped in through the external inlet valve 21 by means of a thermo fogger. The gas comes in two formulas.

One formula of the gas is to be used after fires in order to retard the negative effects of the smoke damage on the equipment which is placed inside the enclosure for treatment and protection.

The second formula of the gas is used pre and post flooding in order to retard the biological activity and other negative effects on the equipment, which is placed inside the enclosure for treatment and protection.

The gas particles are able to penetrate beneath the components on circuit board, without the need for dismantling of the equipment being placed inside the enclosure. The gas has good adhesion properties, when used inside the enclosure. Furthermore the bag enclosure helps the gas to create an even coating on the equipment.

The gas adheres to the surface decreasing oxygen production and preventing oxygen introduction. The gas will not introduce oxygen to the surface as the bonded surface rejects air penetration reducing degradation of the newly formed protective coating.

Examples described herein provide a particle filter on the outlet (FIG. 1, 15) functioning to filter exhaust gases for operator safety.

The filter 15 is designed for filtration and provides an outlet for exhaust, for gases produced within the enclosure, resulting from induced chemical reactions and by-products.

The particulate filter 15 for a gas removal system does not let air in.

Examples described herein provide that the gas that is pumped in contains wax functioning to coat the equipment being protected and functions to protect fusing of smoke particles to the outer casing of the equipment.

The specially formulated gas serves another purpose. Ordinarily, smoke damaged items placed inside a vacuumed bag would cause the outer layer of the bag and the outer casing of the equipment to fuse the acidic smoke to the casing, making it difficult to remove the smoke staining. The specially formulated gas solves this problem.

In addition to the benefits offered by the gas in terms of preventing fusing of smoke to the equipment casing, the appropriate contact layer of the device material has a wax coating, offering enhanced protection from fusing.

The wax layered coatings stops fusion and acid attack of the materials being protected. This material draws smoke residues into its layers whilst the wax provides a sponge effect drawing in the highly charged smoke particles particularly important in high protein type smoke residues.

Examples described herein provide that the gas that is pumped in is bioactive and functions to retard biological activity (e.g. from flooding by seawater).

Examples described herein provide a condensation release valve (FIG. 1, 30).

A condensation control feature 30 may be integrated in to the device. The channels are fitted into the ridges that as mentioned also act as impact barriers, the moisture can be released out of the bag device as and when necessary.

Figure 12:
FIGS. 12 and 13 illustrate, in schematic form, a bag having tongue and groove heat sealable layers in accordance with embodiments of the present invention.
Figure 13:
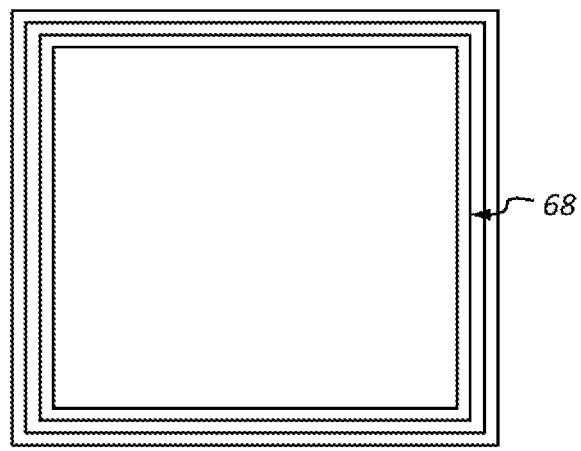

Examples described herein provide a tongue and groove seal that is heat sealable functioning to close the bag (FIGS. 1, 12 and 13).

The bag 1 allows for electronic equipment to be placed inside the device then closed airtight by any of the closing mechanisms: thermal heat sealing 12; Zip Lock™ seal slide 13; and strip and rod insert type seal 14. A combination one or more of the three closing mechanisms can be used.

This bag can be heat sealed or glued or strip sealed or zip-locked air tight, or can be used in combination with all three closing mechanisms creating a triple lock system.

The interlocking design (with sealable thermal lips and slats, tongue and grove) allows for custom builds. Active glue may be used to bond the surface creating an air tight seal.

Examples described herein provide a moisture indicator card in a pouch for manual revealing after initial gas/liquid flow (FIG. 1, 3-6).

Examples described herein provide an ionized air gun port (FIG. 1, 28) that allows for an ionized air gun to be connected to dissipate static charge in the bag.

An ionized air gun port is featured in the design allowing for ionized air gun operation.

Examples described herein provide internal ESD connectors on the inside of the bag to connect to the equipment being protected (FIG. 1, 17).

Examples described herein thus provide another feature, with wire earth node and attachments to combat static build up and static build up produced by air flow across the surfaces. The inside of the bag device allows for a crocodile type clip or screw to connect directly to the item inside. Also attached for external access is an ESD bonding point with a 10 mm diameter.

Examples described herein provide a strip and rod closing mechanism functioning to close the bag (FIG. 1, 14).

The item 2 is placed inside the device thus becoming encapsulated. Then a specially formulated gas is pumped in to the closed device through the inlet port 21.

The bag may recover hydrogen halides using activated carbon sorbent and using pacifying gas to pacify HCl. It also recovers water vapor, thus essential in preventing the production of acid. Hydrogen halides are colorless gases at room temperature producing fumes in moist air.

The mouth of the bag may be heat (or otherwise) sealed at the point of manufacture for storage and transport. Then before use the seal may be broken in order to insert the equipment or item to be preserved. Subsequently, the mouth of the bag is resealed.

Figure 2A:
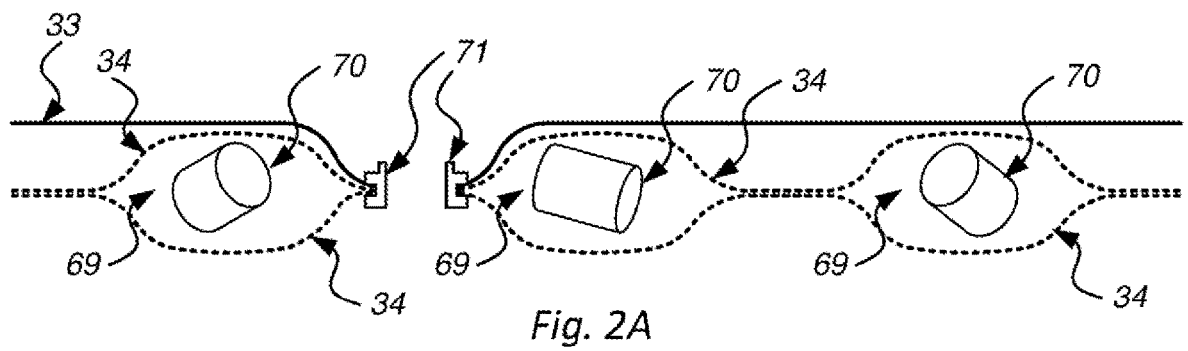
FIGS. 2A to 2C illustrate, in schematic form, sections of a flexible panel and bag with cavities for sorbent material in accordance with an embodiment of the present invention.
Figure 2B:
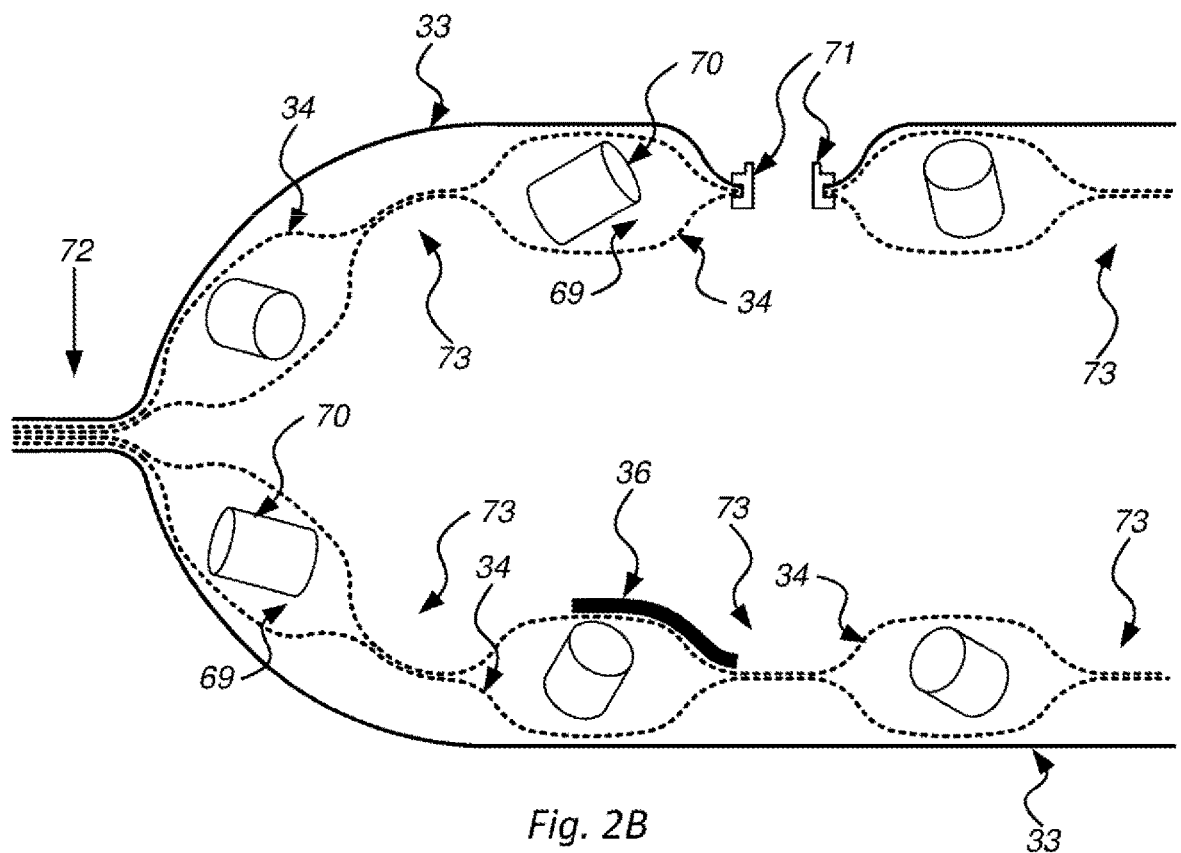
Figure 2C:
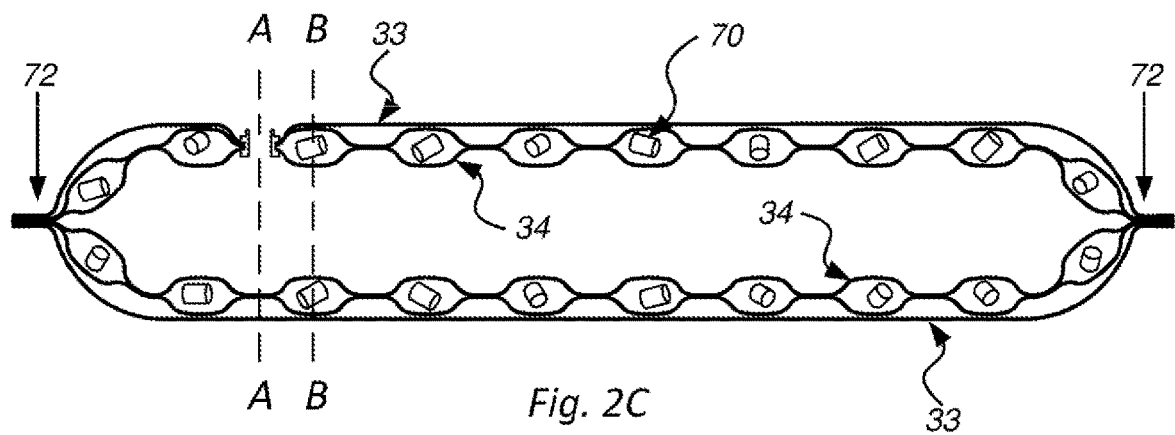

FIGS. 2A to 2C illustrate, sections of a flexible panel and bag with cavities for sorbent material. The example described with reference to FIGS. 2A to 2C may be used in combination with any of the features described with reference to FIG. 1.

FIGS. 2A to 2C illustrate the following features:
- 33: An impermeable outer layer of the bag.
- 34: Permeable inner layers of the bag.
- 69: Cavities arranged in a pattern across the flexible panel.
- 70: Sorbent material contained in the cavities.
- 71: A port through the flexible panel.
- 72: The sealed edges of the bag.
- 73: Channels defined by the innermost permeable layer of the bag.

In the Figures of panels and bags showing cross sections and described herein, small gaps are left between some features in order to aid understanding of the structures being depicted. For example in FIG. 2B, the heat sealed layers 72 are shown as not being abutting, however they are actually in contact with each other. The same is true for example at the feature labelled 73.

With reference to FIG. 2A a section of flexible panel is shown for use in a sealable bag having inner and outer layers, the flexible panel has two permeable inner layers 34 and an impermeable outer layer 33 affixed together so as to provide a plurality of cavities 69 for receiving sorbent material 70. The cavities 69 are arranged in a pattern across the flexible panel. In this case the pattern is an array of constant pitch, however any pattern arrangement that spreads the cavities, and therefore sorbent materials, across the flexible panel (and therefore inner side of the bag) would be suitable. A port 71 is shown extending through all of the layers of the flexible panel. The port 71 is used for introducing into and removing gas and/or liquid from the bag. It is shown here open, but can be connected to with a hose or a closed with a cap. Suitable connectors may be used, such as bayonet or a threaded connector. The port 71 may correspond to the external inlet valve 21, outlet valve 22 or vacuum pull valve 23 described with reference to FIG. 1.

The flexible panel may have one or more electronic components operable to monitor or control a chemical environment in the bag. In this example a sensor 36 is provided printed onto the internal layer 34 of the flexible panel.

Other components may be provided by being affixed or printed on internal layers of the bag, such as: a conductor, a heater, a processor, a communications transmitter, a communications receiver and a GPS receiver.

One or more permeable inner layer may be semi-permeable. This allows the material to influence the chemical environment in the bag by only allowing certain molecules or ions to pass through it by diffusion.

The sorbent material 70 may comprise moisture absorbing and/or oxygen absorbing materials. This influences the chemical environment inside the bag by reducing both the moisture levels and oxygen levels in the bag. This is useful for protecting electronic equipment.

The sorbent material 70 may comprise odor adsorbing materials. This influences the chemical environment inside the bag by reducing odors, so aiding the recovery of the electronic equipment to an acceptable state for reuse.

Although sorbent materials 70 are shown as cylindrical pellets, they could be any shape that fits in a corresponding cavity 69.

The innermost permeable inner layer 34 is configured to provide a plurality of channels 73. In this example of FIGS. 2A to 2C, a pair of permeable inner layers 34 are affixed together so as to provide the plurality of channels 73 in the inner layer 34 commensurate with the pattern of cavities. Channels 73 defined by the inner layer provide an advantageous distributed flow of liquid and gas inside the bag, both to and from inlets and outlets and in to contact with material in the cavities. The channels need not be defined by the cavities, however it is convenient to have just one fabrication or patterning step, such as heat sealing, define both the cavities and channels at the same time.

The permeability of the outermost of the inner permeable layers 33 allows the sorbent to reduce condensation on the inside of the outer permeable layer 34.

Figure 7:
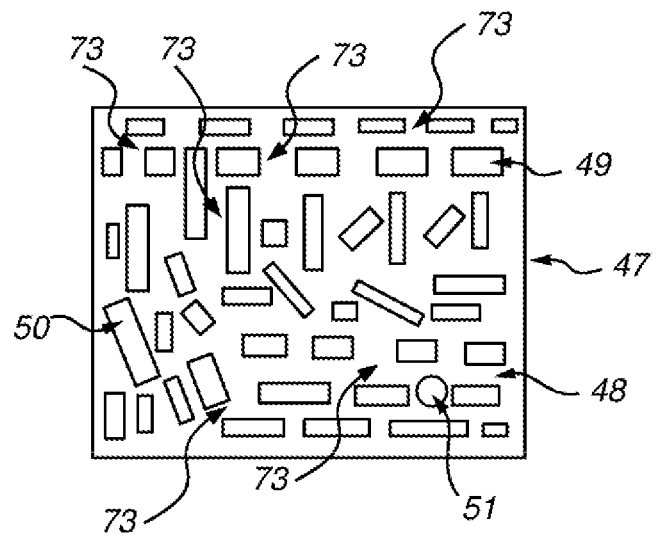
FIG. 7 illustrates, in schematic form, a bag with cavities and interconnected channels in accordance with embodiments of the present invention.

Examples described herein provide that flexible panels may contain moisture absorber (desiccant) and/or oxygen absorber materials (50 in FIG. 7).

FIGS. 3A and 3B illustrate, in schematic form, cross sections of the bag shown in FIG. 2C along dotted lines AA and AB respectively. Features shown in FIGS. 3A and 3B that are labelled with the same reference numerals correspond to the identical features illustrated in FIGS. 2A to 2C.

Within the active bag enclosure in its layer lie chemical agents tied in to the specially made ridges of the layer material 33 and 34 (47 in FIG. 7) capable of absorbing oxygen (for example iron powder) and capable of absorbing moisture (for example silica gel) as well as retarding biological activity, in addition to functions carried by this layer material with its channelled pathways. The retarding of biological activity aids the recovery of the electronic equipment by protecting the personnel who open the bag from harmful biologically active material.

Water damaged items can be placed in the bag device, to absorb water using the highly absorbent material. This material absorbs and locks in moisture many times greater than its own size.

The system allows for the option of integrated fire odor adsorber technology by means of and not limited to activated carbon inserts.

Figure 4:
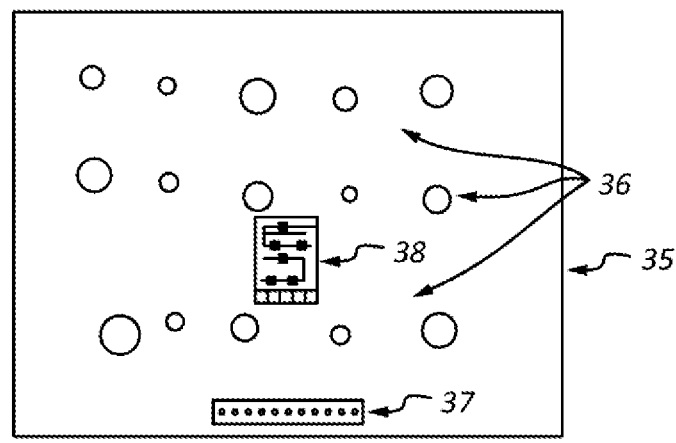
FIG. 4 illustrates, in schematic form, a bag having sensors and control components in accordance with embodiments of the present invention.

FIG. 4 illustrates the following features:
35: Sensor embedded layer.
36: Various sensors printed on to the film layer.
37: Electronics connector port.
38: Optional placement of an internal monitoring and/or controller computer. The entire processor may be the size of a SD (Secure Digital) card.

Figure 5:
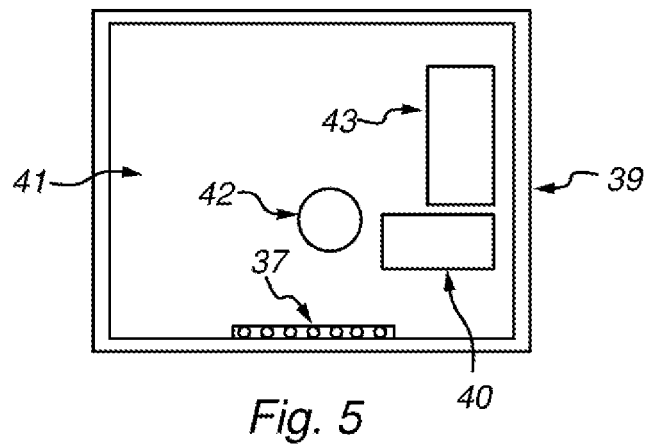
FIG. 5 illustrates, in schematic form, a bag for use with an external controller module in accordance with embodiments of the present invention.

FIG. 5 illustrates the following features:
39: Optionally, the electronics controller module 39 may be externally mounted outside of the enclosure.
37: Connector port.
40: EEPROM read/write memory.
41: Printed circuit board.
42: Lithium battery.
43: Electronics components.

The gas film layer, deposited on the equipment components in the bag, after a prolonged time may become less effective. Thus the problem; usually at this point the device would become less effective. However a feature of this device allows for the electronics components of the device to take over keeping the device active, protecting the item for several months at a time.

This approach allows for the chemical or electrochemical or biological or thermal or combinations of the aforementioned surrounding conditions within the enclosure to be changed and adjusted for optimal protection of the item placed inside the device. This may be done, for example by the controller activating the heater, actuating electromechanical outlet valves (not shown), or sending an alert to trigger action by a technician.

Examples described herein provide an internal electronic controller with internal sensors optionally embedded in the bag multilayer flexible panel, alternatively with external connectors to an external controller.

With reference to FIG. 4, interconnected layers provide the option for sensor technology 35. With reference to FIG. 5, interconnected layers may include real-time monitoring and computing technology 38.

Examples of the bag may include a colorimetric sensor, which may provide accurate measurement of oxygen transition rates within this type of bag enclosure.

This approach can measure a range of pre-set conditions. Versions of the bag can function in real time, through microprocessors, sensor embedded films (FIG. 4) and remote monitoring and software programs which can process the pre-set conditions of the environment within the device, allowing for critical optimal preferred levels to be maintained. Real-time alert notifications can be sent to the user, giving warnings of unwanted environmental conditions encountered within the device in addition to location tracking, movement and tampering of the device. This location and GPS tracking feature can be used as standalone device for transportation purposes.

This approach allows for manual intervention, or for the more elaborate versions to offer remote intervention where manual intervention to monitor or adjust the conditions within the enclosure is not feasible, practical or desired. This remote activation and assistance feature allows for remote monitoring and or adjustment of the surrounding conditions inside the device.

The approach has the optional functionality to change the environment within the enclosure, actively protecting the item for months at a time.

Figure 6:
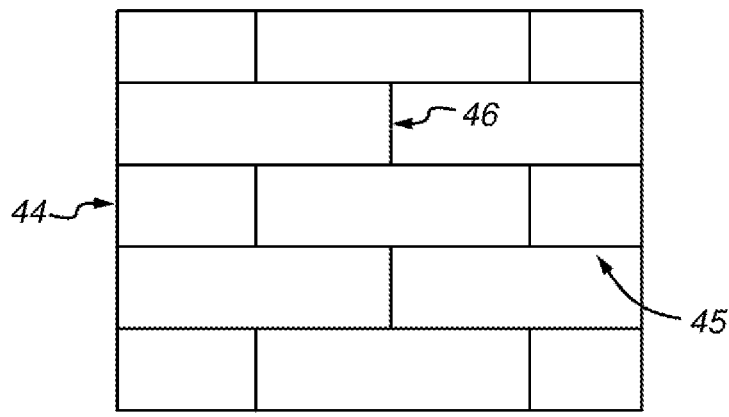
FIG. 6 illustrates, in schematic form, a cross section of layers of the bag connected by tie rods in accordance with embodiments of the present invention.

FIG. 6 illustrates the following features:
44: Cross section of the tie rod connection setup.
45: Cross section of the material layers connected by the tie rods.
46: Tie rods.

Examples described herein provide a multi-layer bag with spacers (tie rods, FIG. 6) between layers to allow gas/moisture flow but that are collapsible when the full vacuum is applied.

The tie rods 46 supports lifts between the layers and prevents sticking, allows for lifting of the individual layers, helps function more effectively helping in better distribution of gas and nitrogen being pumped in, allows for the inside environmental adjustment without opening the enclosure.

Nano tie rods may be fitted between the sheets, to prevent moisture and gas vapor pockets traps. The tie rods allow for lifting between sheets to allow for air movement.

FIG. 7 illustrates the following features:
47: Raised ridge complete layer.
48: Pathways between the raised ridges corresponding to the cavities between the inner and outer layers support moisture and gas flow and prevent pathway blockages giving alternative routes for the gas and moisture to travel.
49: The raised ridges also act as impact barriers and thus are constructed to absorb shock impacts.
50: The raised ridges may contain moisture absorbing and oxygen absorbing materials.
51: Shows the optional fixed placed close-proximity heat activator.

Examples described herein provide tubes in the channels functioning to wick moisture by capillary action.

Examples described herein provide ridges/channels in the inner surface of the bag with channels functioning to facilitate gas/moisture flow.

This approach helps to address the negative effects encountered by compression blockage narrowing or blockage of the channels caused by vacuum pull and surface contact of the device. The width depth and gauge of the channels and ridges allow for water molecules and gases to be directed to another channel should one channel become blocked.

This approach allows the $H_2O$ molecules to leave the material to be dried and gives the $H_2O$ molecules a path to the drying agent 48. Furthermore, this approach allows molecules to diffuse into the reactive drying agent.

Due to the precisely placed desiccant material 50, when moisture flows through these pathways, this design feature allows for the moisture to make contact with the chemical agent. This action allows for the moisture to be arrested locking the moisture in to the material chambers. This helps to reduce the quantity of free water molecules within in the device in turn reducing oxidation and biological activity.

Examples described herein provide ridges functioning as impact barriers.

The ridges 49 are designed and constructed to give a cushion affect acting as impact barriers, helping to absorb shocks from knocks and bangs thus reducing the impact on the equipment placed inside the device, during for instance, transporting. The ridges 49 correspond to the cavities shown in FIGS. 2A to 3B, as well as the cavities shown in FIGS. 16 to 20B.

The features described with reference to FIGS. 1 and 4 to 13 may, each or in combination, be used in combination with the examples described with reference to FIGS. 2A to 3C as well as in combination with the examples described with reference to FIGS. 14A to 20.

With reference to FIG. 7, another feature provides for the use of tubing, shaped like drinking straws, vertically configured on the pathways along the ridges 48 giving function to capillary movement through cohesion and adhesion.

When water comes in contact with the tubing, the tiny tube-shaped inserts allows the water to be pulled away, drawn through the tubing towards the positioned outlet valve. This helps to reduce the reaction between the water and the metallic surface (oxidization). This configuration also helps to combat the chemical reactions particularly that which takes place when HCL meets $H_2O$ molecules in the confines of a closed space, intensifying the likelihood for corrosion and giving rise to the problem of sweating inside the enclosure.

Another design feature makes use of gravity, vacuum pressure, temperature, and vapor pressure to assist with the desired movement of water vapor and other fluids (gases or liquids) within the enclosure.

The device uses both condensation and evaporation process to its advantage in recovering greater amounts of contaminants than otherwise without.

With reference to FIG. 7, at least some of the channels 73 may be interconnected. The interconnection of the channels 73 provides a further distributed flow of liquid and gas inside the bag and in to contact with further material in the cavities. At least some of the channels may be configured to radiate from an outlet of the bag. The channels radiating from an outlet of the bag provides channelled flow of liquid and gas inside the bag towards the outlet. This feature allows for the release of trapped air, and allows for moisture movement to happen in order for the extraction to be more effective.

Figure 8:
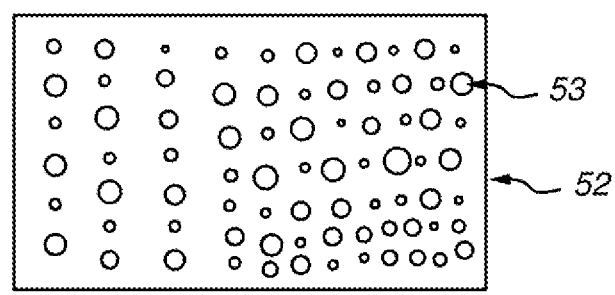
FIG. 8 illustrates, in schematic form, a bag with critical diameter pores in accordance with embodiments of the present invention.
Figure 9:
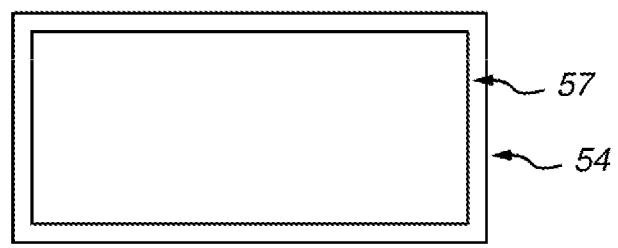
FIG. 9 illustrates, in schematic form, a bag with a catchment reservoir in accordance with embodiments of the present invention.

FIG. 8 illustrates the following features:
52: Shows the critical membrane diameter layer which is used.
53: Points to critical diameter pores (not to scale).
FIG. 9 illustrates the following features:
54: Shows the optional one way entrapment catchment layer.
57: Shows the catchment reservoir.

Examples described herein provide membrane layer with different sized pores 53 functioning to separate and entrap different gases/liquids.

The layers may have a selectively permeable membrane, differentially permeable membrane configuration assembled to order at the manufacture stage.

Vacuum sealable material is integrated into the multi-layer design, which consists of individual layers of specific material, including ESD material, membrane molecular sieves, chemical delivery membrane and multipurpose raised ridged layer acting as an impact absorber and a path to the drying agent.

The multi-layer feature allows for oxygen, moisture, gases, odor molecules and volatile organic molecules to channel through the correct paths using respective critical diameter pores embedded within each specific layer.

The molecular sieve design of the optional multi-layer material, allows for each gas and liquid to be selectively trapped on to the preferred layer, for removal or absorption or decontamination.

The active individual layer arrangement, favors an efficient performance of the load distribution on each membrane configuration.

Figure 10:
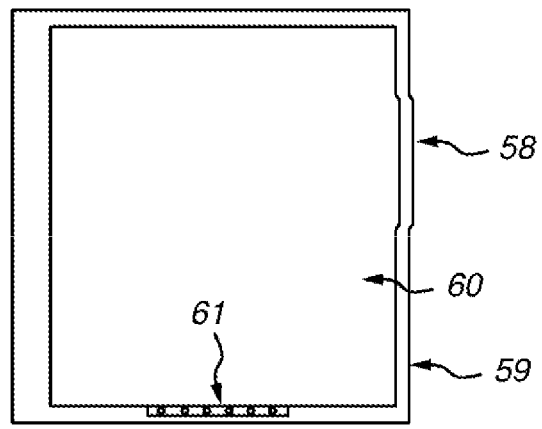
FIG. 10 illustrates, in schematic form, a bag with an externally powered heating element in accordance with embodiments of the present invention.

FIG. 10 illustrates the following features:
58: Shows the optional fully collapsible heating layer.
59: Shows the outer layer.
60: Heating element.
61: Electronics connector port.

Examples described herein provide internal heating means, optionally as heating layer (FIG. 10, 58, 60), optionally with external electrical connections.

The bag may allow for vaporization of sitting water. This is aided by the optional heating element 60.

Figure 11:
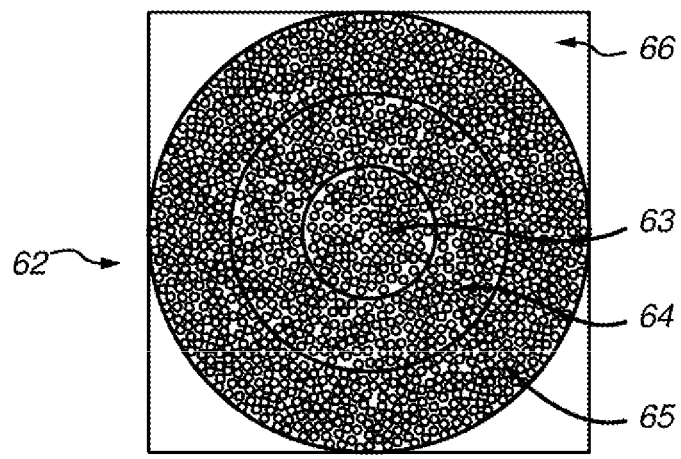
FIG. 11 illustrates, in schematic form, a sealed tablet having active ingredients in accordance with embodiments of the present invention.

FIG. 11 illustrates the following features:
62: Readymade active ingredients ball.
63: Oxidizing agent.
64: Heat generator material.
65: Moisture absorbing agent.
66: Peel of tab protective packaging.

With reference to FIG. 11, a spherical ball-shaped tablet of moisture absorber (desiccant) and oxygen absorber materials and optional heating chemicals is shown. It for use in a bag. It is activated by breaking a seal (e.g. peeling). This ball or tablet can be provided on its own or as a consumable for use with any sealable bag. The tablet is not limited to being spherical in shape, for example it may be a cylinder, cube cuboid, cone, hexagonal prism, ellipsoid, cone, prism or pyramid.

This tablet can work with the active ingredients being chemical agent, moisture absorber and heat activator, kept in individual compartments or layers of the tablet readymade in to the ball of FIG. 11 which is activated by peeling of the packaging 66 and placing directly in to the bag.

The ball option containing the active ingredients 62 allows for the chemical agents to work more effectively, the ball option is useful when using custom build option to encase large electronic equipment, machinery, etcetera. The ball may be used with a plain bag (having no sorbents). For example in the event of a flood warning a television or sofa for example could be placed in a large bag. After breaking the seal on the ball by tearing off the peelable layer and putting the ball into the bag. The ball may further contain a structure, such as a cage or a mesh, to contain the materials of the ball and separate them from the contents of the bag, while allowing the oxygen and moisture absorbers to function.

FIG. 12 illustrates the following feature:
67: Shows the tongue side of the (tongue and groove) heat sealable layer, which aids custom builds and seal tightness. In custom builds, flexible panels provided in sheets or on a roll may be cut to size and assembled into larger structures using the heat sealing and/or tongue and groove to attach panels together.

FIG. 13 illustrates the following feature:
68: Shows the groove side of the (tongue and groove) heat sealable layer, which aids custom builds and seal tightness.

In FIGS. 14A to 15C, references numerals in common with those described with reference to FIGS. 2A to 2C describe the same features.

Figure 14A:
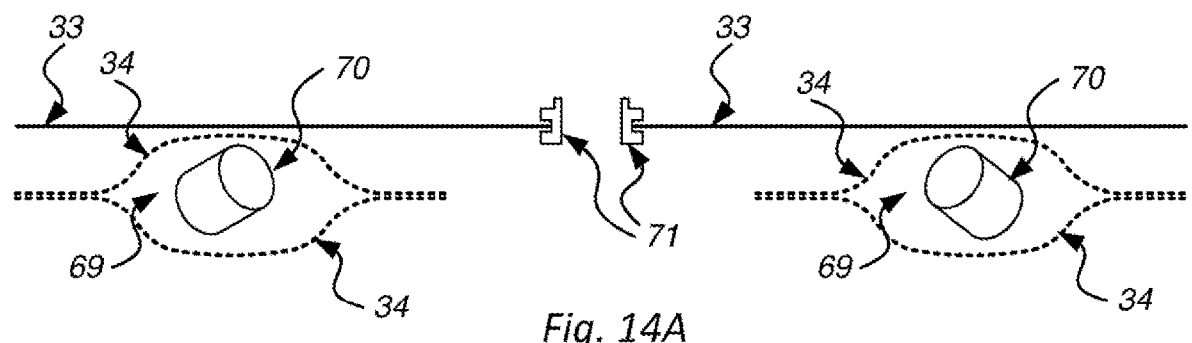
FIGS. 14A to 14C illustrate, in schematic form, sections of a flexible panel and bag with cavities for sorbent material defined by non-continuous permeable layers in accordance with an embodiment of the present invention.
Figure 14B:
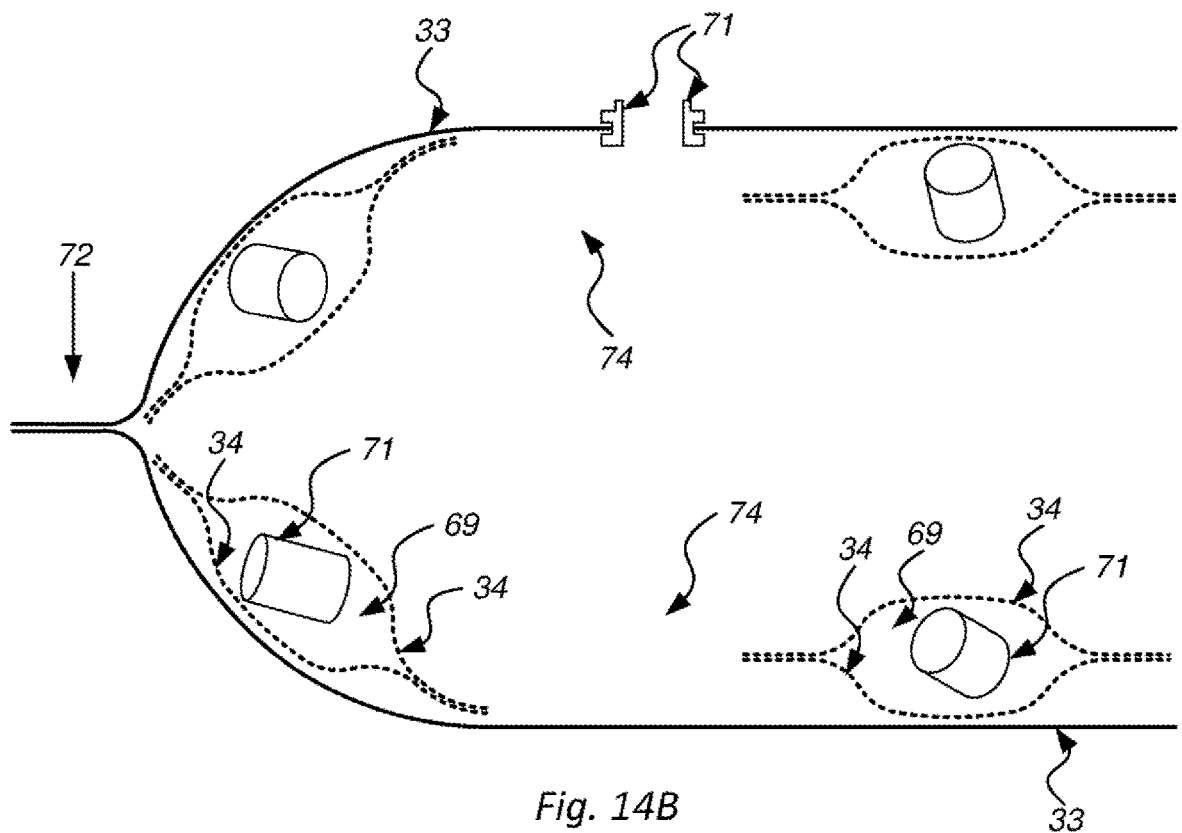
Figure 14C:
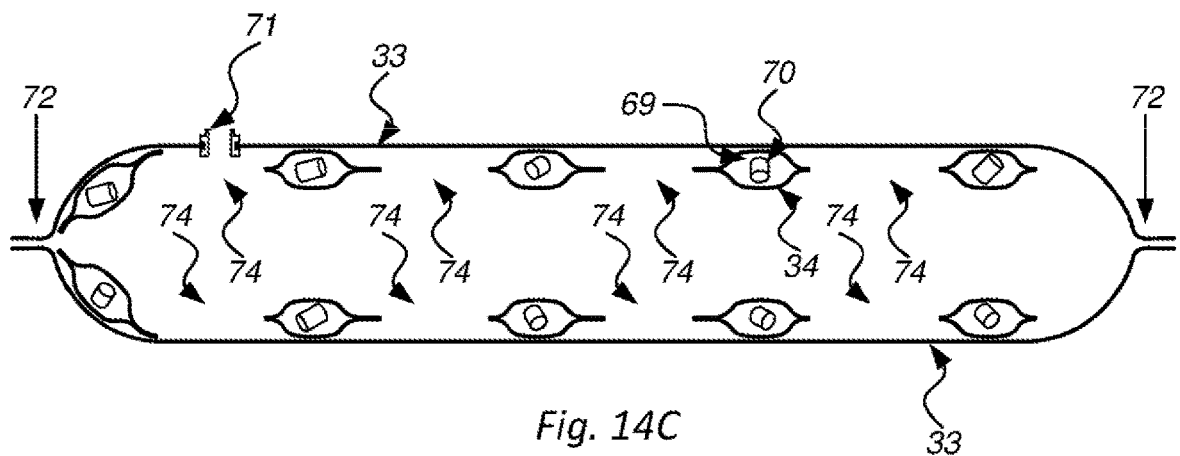

FIGS. 14A to 14C illustrate, in schematic form, sections of a flexible panel and bag with cavities for sorbent material defined by non-continuous permeable layers 34. In this example the inner layers 34 defining the cavities may be affixed to the outer layer using adhesive. The pairs of permeable inner layers 34 have gaps 74 between them in the plane of the flexible panel so as to provide a similar effect as the plurality of channels 73 illustrated in FIGS. 2A to 2C. Similar to the channels 73 discussed with reference to FIGS. 2A to 2C, the gaps 74 in this example defined by the edges of the inner layers provide an advantageous distributed flow of liquid and gas inside the bag, both to and from inlets and outlets and in to contact with material in the cavities.

Figure 15A:
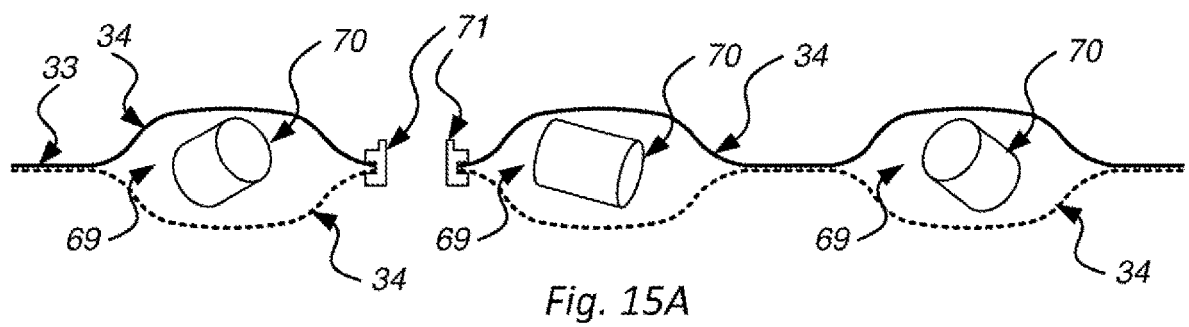
FIGS. 15A to 15C illustrate, in schematic form, sections of a flexible panel and bag with cavities for sorbent material defined by a single permeable layer in accordance with an embodiment of the present invention.
Figure 15B:
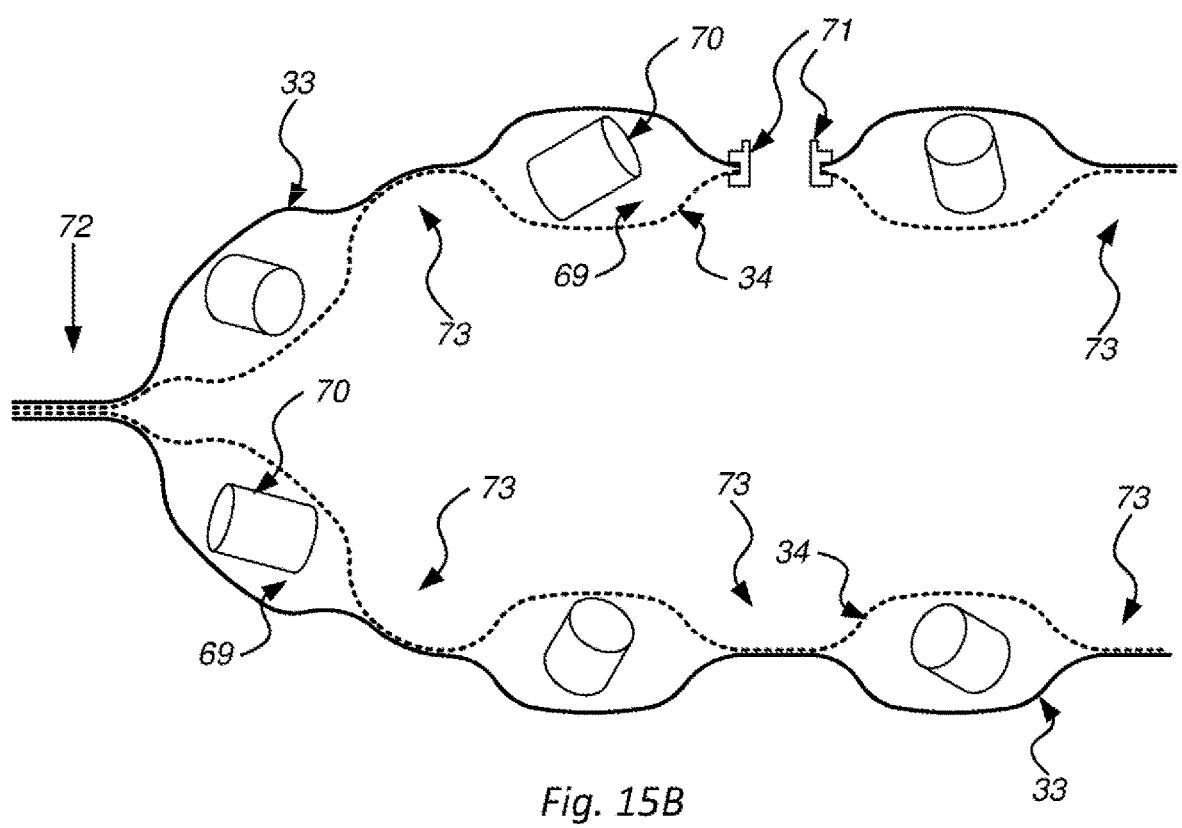
Figure 15C:
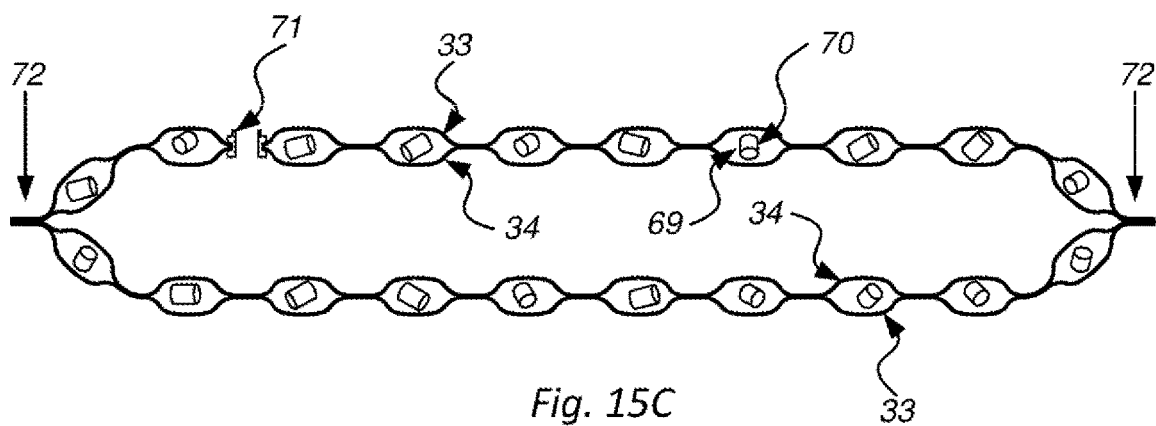

FIGS. 15A to 15C illustrate, in schematic form, sections of a flexible panel and bag with cavities for sorbent material defined by a single permeable layer.

With reference to FIGS. 15A to 15C, in this example the inner layer is affixed to the outer layer by conventional heat sealing. In this example, the impermeable outer layer 33 and a permeable inner layer 34 are affixed together so as to provide a plurality of channels 73 in the inner layer 34 commensurate with the pattern of cavities. Channels 73 defined by the inner layer provide an advantageous distributed flow of liquid and gas inside the bag, both to and from inlets and outlets and in to contact with material in the cavities. The outer layer also has channels, but it is the channels 73 defined by the inner layer that provide an advantageous distributed flow of liquid and gas inside the bag, both to and from inlets and outlets and in to contact with material in the cavities.

Having the approach of a permeable inner layer with cavities arranged in a pattern across the flexible panel allows the sorbent and optional biologically retardant material to influence the chemical environment in the bag by allowing liquids or gases to pass through the inner layer, while keeping the sorbent (such as the moisture absorbing and/or oxygen absorbing materials) separated from the contents of the bag and at the same time distributed across the flexible panel, so covering a large area of the items (such as electrical equipment) in the bag.

With multiple cavities being in the flexible panel, they distribute the location of the sorbent away from the bottom and corners of the bag where liquid can gather that could saturate the material.

Having the cavities integrated with the bag allows loading during manufacture of the flexible panels of the bag with the optimum amount of sorbent. Thus the flexible panels can be manufactured with the optimum amount of sorbent per unit area. The flexible panels may be conveniently manufactured and shipped as a long roll that can be cut to the desired length of panels by the end user, for assembly into bags of the optimum size.

The mouth of the bag may be sealed by heat sealing the lips of the mouth defined by the flexible panel. Alternatively, the mouth of the bag may be sealed by attachment to a floor, using tape for example. If a such a bag is made of several flexible panels attached together, it is in effect a tent that will protect and preserve its contents. This is useful for large and heavy equipment that cannot be easily lifted into a bag.

During manufacture, or even if the user loads the material into the cavities themselves, then the size of the cavities defined by the affixing pattern can serve to measure out the sorbent with the user simply filling up the cavities in turn to give a total amount proportional to the inner surface of the bag.

The cavities can be preloaded during manufacture with sorbent, thus reducing the number of components in the system for the end user. Thus, the user does not have the inconvenience of carrying separate packets of absorber material.

Preloading the cavities during manufacture can secure the sorbent materials so that they don't fall out of the bag.

As discussed with reference to FIG. 1, nitrogen or a specially formulated pacifying gas may be pumped in through the inlet valve 21 by means of a thermo fogger. A problem is that when pumping the pacifying medium into the bag to coat the surface of the equipment therein, the pacifying medium can interact with the sorbent and/or biologically retardant material. This can make the surface coating delivered by the pacifying medium less effective. It can also contaminate the sorbent and/or biologically retardant material, making it less effective in protecting the equipment from corrosion.

FIGS. 16 to 20 disclose an embodiment that addresses this problem.

Figure 16:
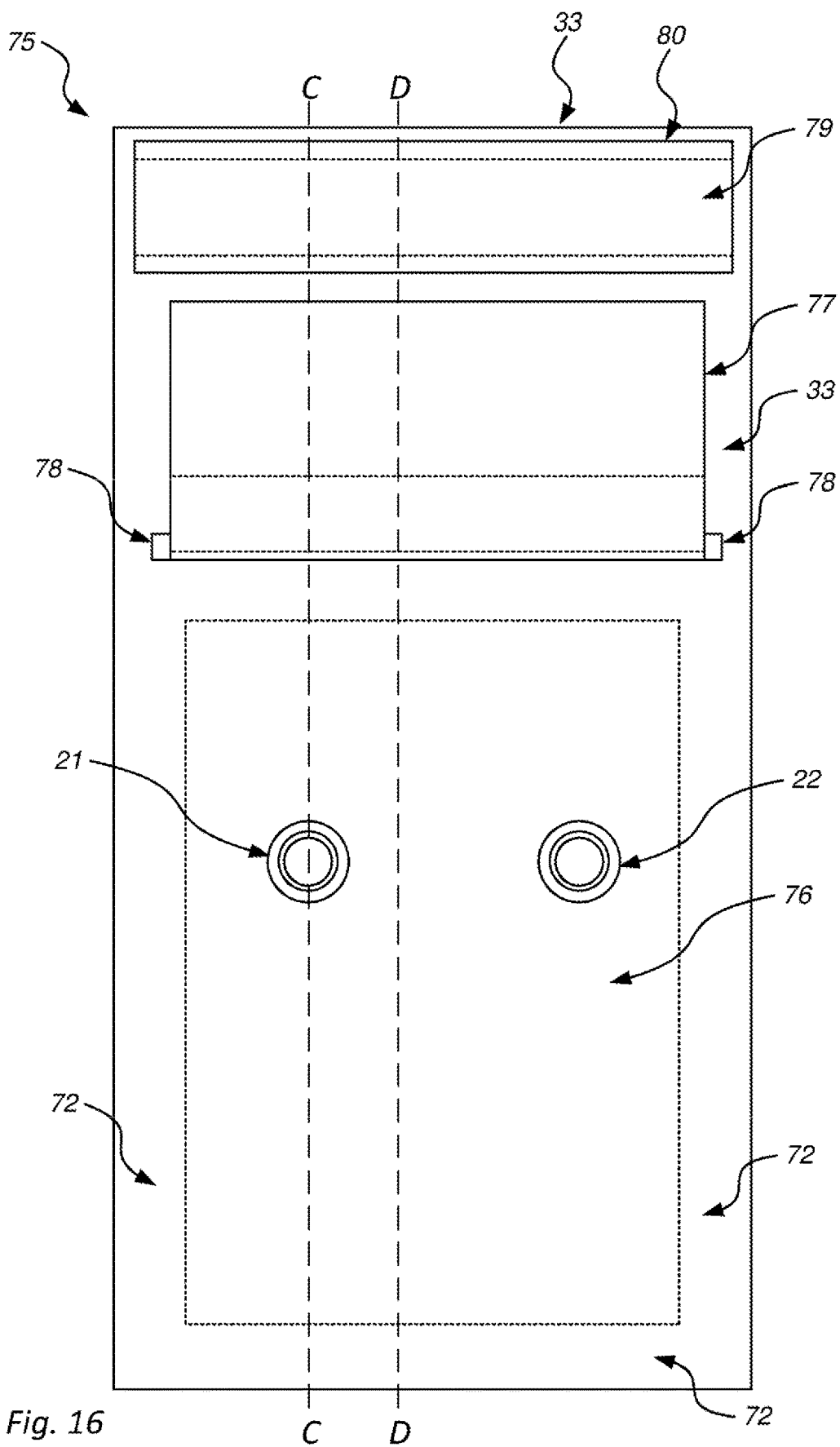
FIG. 16 illustrates, in schematic form, a plan view of a bag having a manually rupturable impermeable inner layer in accordance with an embodiment of the present invention.

FIG. 16 illustrates, in schematic form, a bag having a manually rupturable impermeable inner layer.

The bag may have a flexible panel with cavities for sorbent material in accordance with the example described with reference to any of FIGS. 2A to 3B, 14A to 14C, 15A to 15C, alone or in combination. Alternatively, in other embodiments (not shown in the Figures) the manually rupturable impermeable inner layer described with reference to Figured 16 to 20C may be used with flexible panels having no cavities for sorbent material. For example the sorbent materials may be in loose sachets in the bag or provided as layers laminated in the flexible panel or as separate sheets. In any case, the manually rupturable impermeable inner still serves to separate the sorbent from the item in the bag while the pacifying gas is being used.

Figures 17A, 17B:
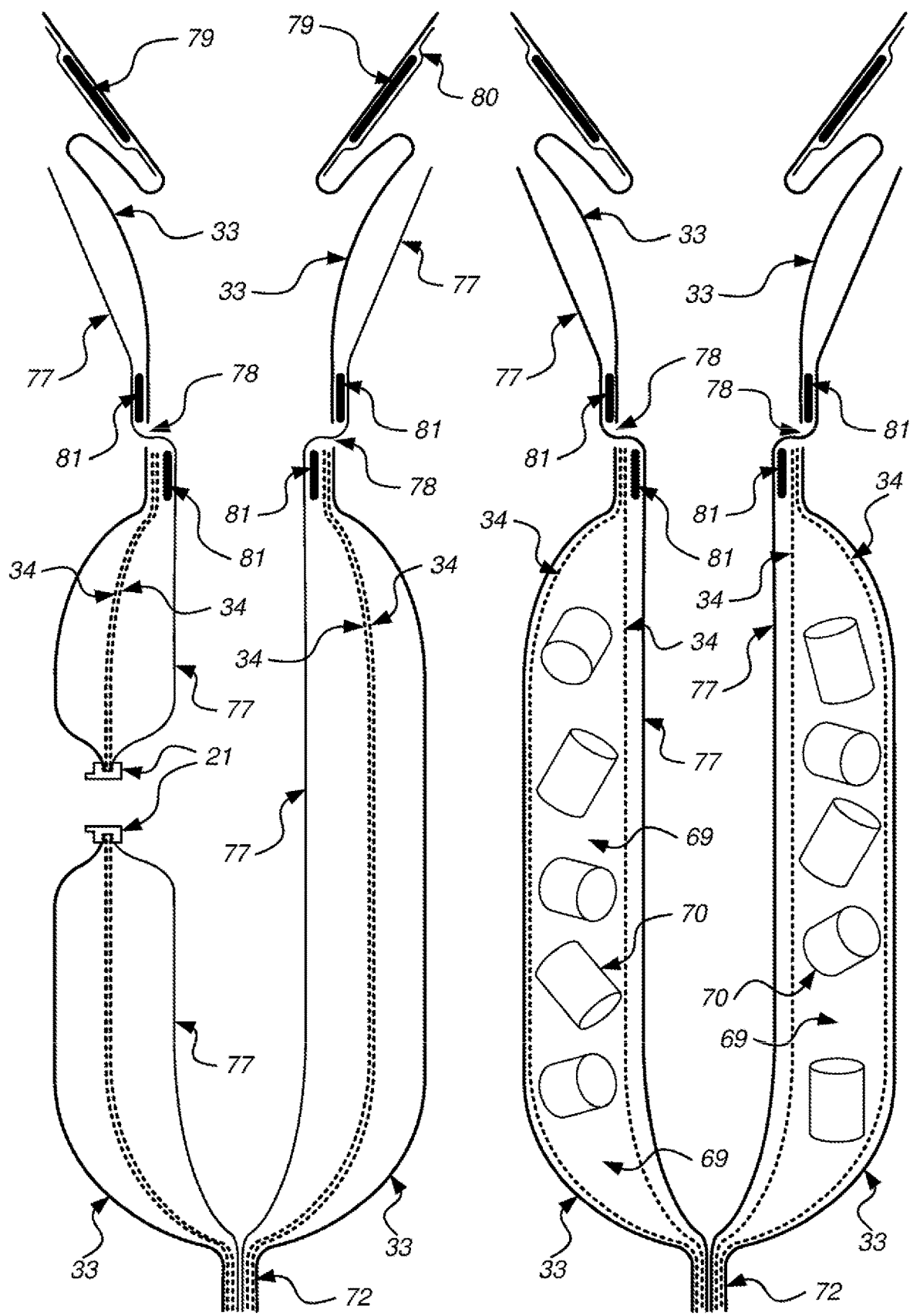
FIGS. 17A and 17B illustrate, in schematic form, cross sections of the empty bag shown in FIG. 16, having a manually rupturable impermeable inner layer adhered to first adhesive seals to seal an aperture, in accordance with an embodiment of the present invention.

The bag 75 is shown in plan view with an outer layer 33. The dotted lines show the edges of curved features visible in plan view, thus indicating the topology of the bag. FIGS. 17A to 17B show the same bag in cross section along lines CC and DD respectively. With reference to FIG. 16, the flexible panel 76 has at least one permeable inner layer and an impermeable outer layer 33 affixed together so as to provide a plurality of cavities for receiving sorbent material, the cavities being arranged in a pattern across the flexible panel. In this view, only the impermeable outer layer 33 of the flexible panel is visible. Around the flexible panel, the heat sealed edges 72 of the bag are shown. The external inlet valve 21 and outlet valve 22 are shown.

In this document and claims, affixed can mean directly affixed, for example in contact, and indirectly affixed, for example indirectly via another layer or via an intermediate adhesive layer.

An impermeable inner layer 77 can be seen protruding from an aperture 78 in the impermeable outer layer 33.

The impermeable outer layer 33 is provided with a second adhesive seal 79, covered by a peelable protective layer 80.

FIGS. 17A and 17B illustrate, in schematic form, cross sections of the empty bag shown in FIG. 16, having a manually rupturable impermeable inner layer 77 adhered to first adhesive seals 81 to seal an aperture.

The impermeable inner layer 77 is affixed to the impermeable outer layer 33 at the heat sealed edge of the bag 72 and disposed on the opposite side of the pair of permeable inner layers 34 from the impermeable outer layer 33. The impermeable inner layer 77 is configured to separate the cavities 69 from contents of the sealable bag. In this example, the inner layer 77 is affixed indirectly by the heat seal 72 to the outer layer 33 via the sandwiched inner layers 34.

The impermeable outer layer 33 is provided with at least one first adhesive seal 81 around the aperture 78. The impermeable inner layers 77 are removably adhered to the first adhesive seals 81 to seal the aperture 78 of the impermeable outer layer 33. The extremities of the aperture 78 (visible in FIG. 16) may not be completely sealed by the first adhesive seal with the impermeable inner layer adhered to it. However, by making the sheet of impermeable inner layer 77 and first adhesive seal 81 the same or nearly the same width as the aperture 78, an acceptable seal may be maintained. Alternatively or in addition, external adhesive patches (not shown) may be applied to the extremities of the aperture to enhance the sealing.

As will be described further in the following figures, the impermeable outer layer 33 comprises an aperture 78 for manual rupturing of the impermeable inner layer 77 in use to expose the cavities 69 (and the sorbents 70 contained therein) to the contents of the sealable bag.

Figures 18A, 18B:
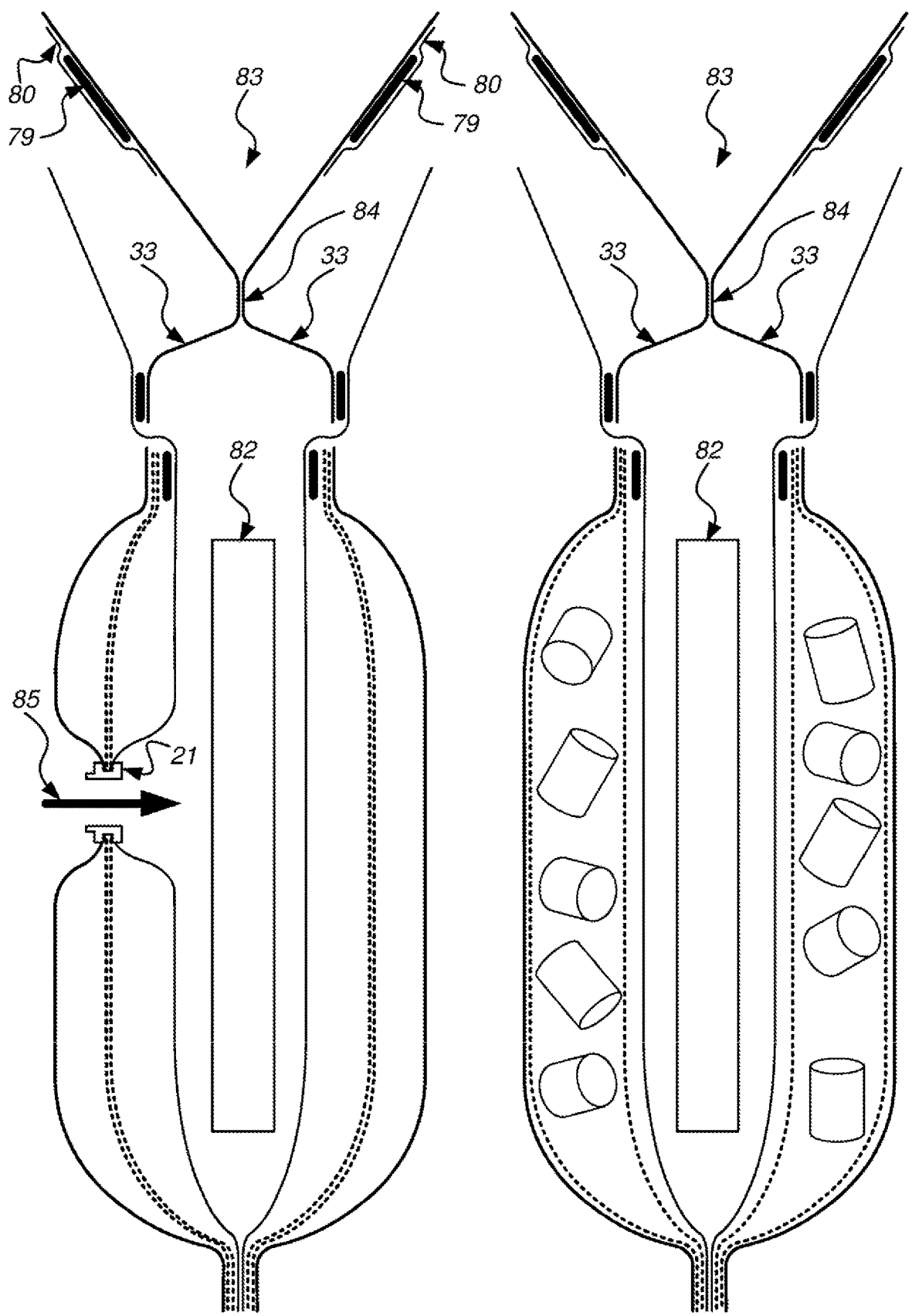

FIGS. 18A and 18B illustrate, in schematic form, cross sections of the bag shown in FIGS. 17A and 17B, having had an item 82 inserted, and having been sealed at the mouth of the bag 83. Features in FIGS. 18A and 18B that are not labelled with reference numerals correspond to the identical features illustrated in FIGS. 17A and 17B. The mouth of the bag 83 may be sealed by heat sealing 84 of the impermeable outer layers 33 that define the mouth of the bag. Pacifying gas is illustrated being pumped in as a large arrow 85. Features in FIGS. 18A and 18B that are not labelled with reference numerals correspond to the identical features illustrated in FIGS. 17A and 17B.

Figure 19A:
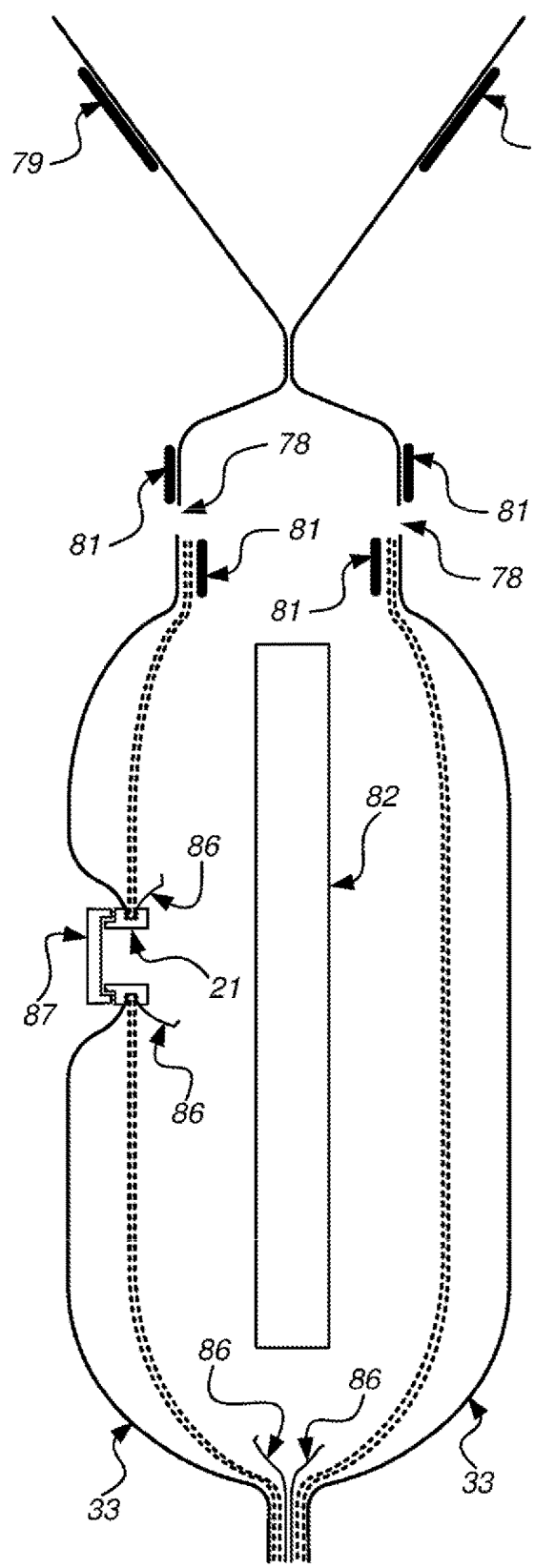
FIGS. 19A and 19B illustrate, in schematic form, cross sections of the sealed bag shown in FIGS. 18A and 18B, after removal of the manually rupturable impermeable inner layer by pulling it out of the bag through the aperture.
Figure 19B:
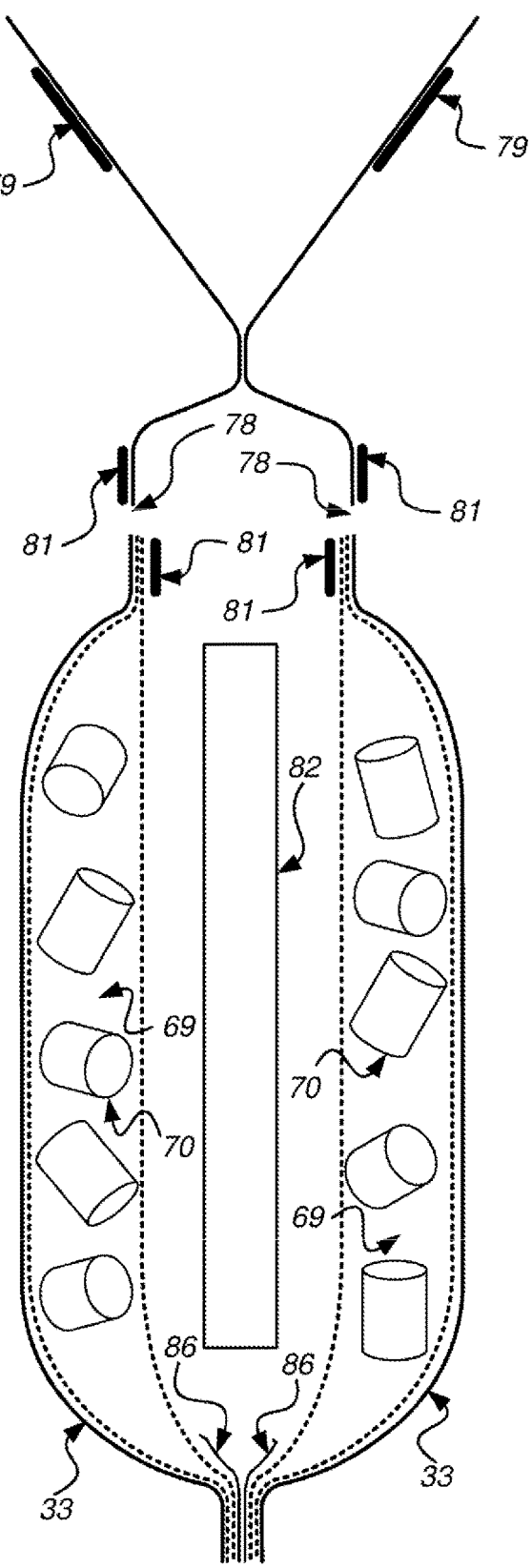

FIGS. 19A and 19B illustrate, in schematic form, cross sections of the sealed bag shown in FIGS. 18A and 18B, after removal of the manually rupturable impermeable inner layer 77 by pulling it out of the bag through the aperture 78. Features in FIGS. 19A and 19B that are not labelled with reference numerals correspond to the identical features illustrated in FIGS. 17A and 17B.

The remnants 86 of the impermeable inner layer 77 are shown. The impermeable inner layer 77 is thus manually rupturable in use to expose the cavities 69 to the contents 82 of the sealable bag. In this example the impermeable inner layer 77 is manually detachable in use from the impermeable outer layer 33 to expose sorbent materials 70 in the cavities 69 to the contents 82 of the sealable bag. It will be apparent to the skilled person that to be detachable means that the impermeable inner layer becomes substantially unattached to the impermeable outer layer. For example, as described herein, a relatively small remnant of the impermeable inner layer remains affixed to the impermeable outer layer, when the impermeable inner layer is detached.

Other ways of manually rupturing the impermeable inner layer 77 may include tearing by distorting the bag or pulling a string through a small aperture in the impermeable outer layer 33 so as to tear the impermeable inner layer 77.

The impermeable outer layer 33 is provided with a second adhesive seal 79. The second adhesive seal 79 is configurable to seal the aperture 78 of the impermeable outer layer 33 after removal of the impermeable inner layer 77 from the at least one first adhesive seal 81. In this example shown in FIGS. 19A and 19B, the protective strip shown in FIGS. 16 to 17B has been removed prior to the next step shown in FIGS. 20A and 20B.

Furthermore, a cap 87 has been put on the inlet port 21.

Figure 20A:
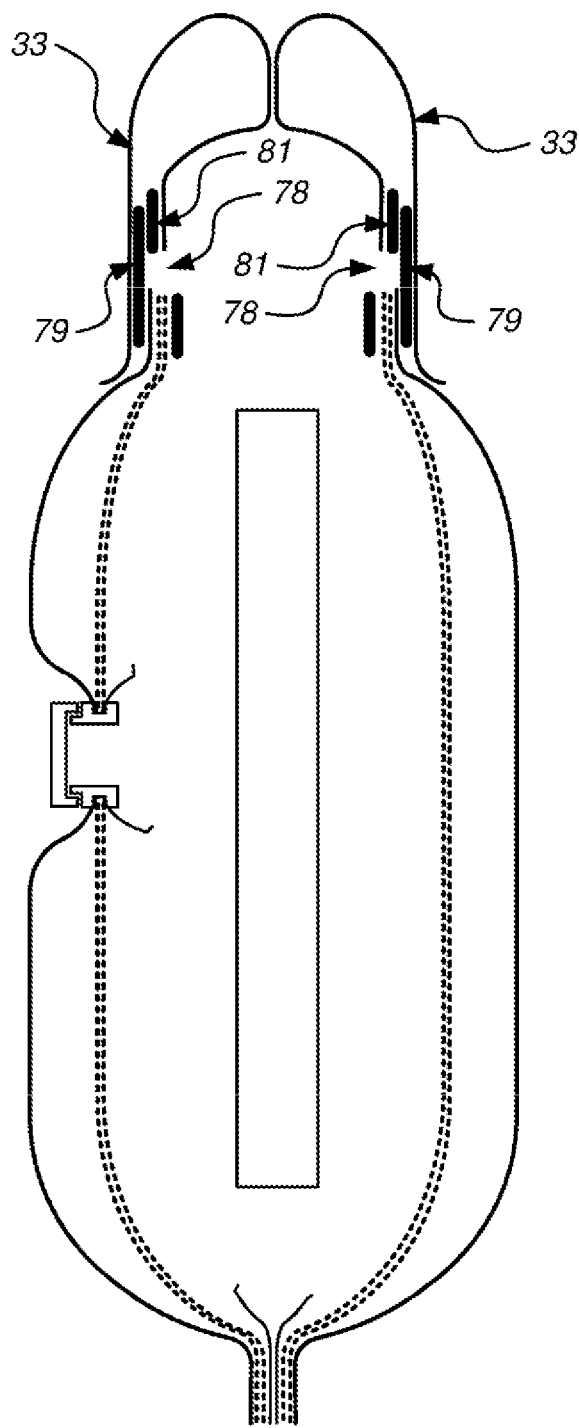
FIGS. 20A and 20B illustrate, in schematic form, cross sections of the sealed bag shown in FIGS. 19A and 19B, after sealing the aperture of the impermeable outer layer using a second adhesive seal.
Figure 20B:
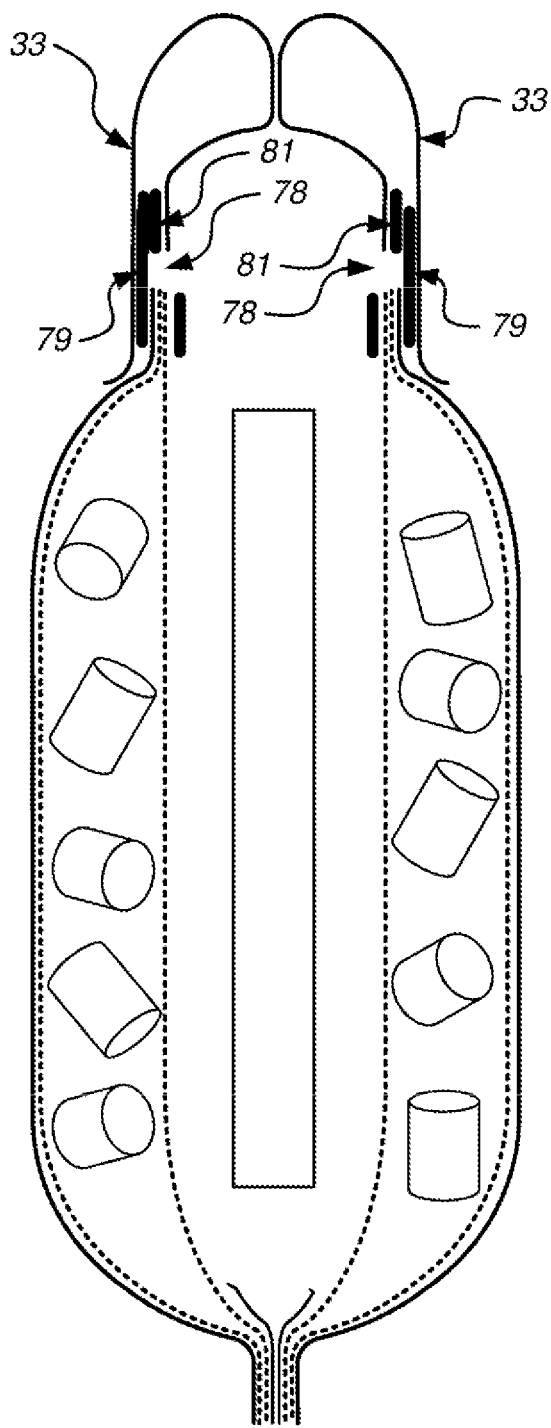

FIGS. 20A and 20B illustrate, in schematic form, cross sections of the sealed bag shown in FIGS. 19A and 19B, after sealing the aperture of the impermeable outer layer using a second adhesive seal. Features in FIGS. 20A and 20B that are not labelled with reference numerals correspond to the identical features illustrated in FIGS. 17A and 17B. The top of the impermeable outer layer 33 has been folded over to bring the second adhesive seal 79 in place to cover the aperture 78. The second adhesive seal 79 seals the aperture by adhering to a part of the first adhesive seal 81 and the other surface of the outer impermeable layer 33.

With reference to FIGS. 16 to 20B, a method of preserving an item is described below.

The method comprises the steps of:

providing a sealable bag comprising at least one flexible panel comprising at least one permeable inner layer 34 and an impermeable outer layer 33 affixed together so as to provide a plurality of cavities 69. The cavities 69 are arranged in a pattern across the flexible panel. A plurality of the cavities 69 contain sorbent material 70 such as oxygen absorber and/or moisture absorber. The flexible panel further comprises an impermeable inner layer 77 affixed to the impermeable outer layer 33 and disposed on the opposite side of the permeable inner layers 34 from the impermeable outer layer 33. Thus the impermeable inner layer 77 separates the cavities 69 and sorbent 70 contained therein from contents 82 of the sealable bag;

inserting an item to be preserved 82 in the sealable bag;

sealing 84 the bag;

introducing 85 pacifying gas into the bag;

removing pacifying gas from the bag after a dwell time. This step is optionally omitted if the pacifying gas can become depleted over time, such that it is acceptable to then allow it to reach the sorbent material in the cavities; and manually rupturing the impermeable inner layer to expose the cavities 69 (and this the sorbent 70) to the item 82 in the sealed bag.

The step of manually rupturing the impermeable inner layer may involve manually detaching the impermeable inner layer from the impermeable outer layer to expose the cavities to the item in the sealed bag.

The aperture 78 is provided in the impermeable outer layer, and the step of manually rupturing the impermeable inner layer uses the aperture.

The method may further comprise the steps of:

providing the impermeable outer layer 33 with at least one first adhesive seal 81 around the aperture 78;

removably adhering the impermeable inner layer 77 to the at least one first adhesive seal 81 to seal the aperture 78 of the impermeable outer layer 33; and manually rupturing the impermeable inner layer 77 by manually detaching the impermeable inner layer 77 from the first adhesive seal 81 and pulling the impermeable inner layer 77 out of the bag through the aperture 78.

Finally, the method further comprises the steps of:

providing the impermeable outer layer 33 with a second adhesive seal 79; and sealing the aperture 78 of the impermeable outer layer (see FIGS. 20A and 20B) using the second adhesive seal 79 after pulling the impermeable inner layer 77 out of the bag through the aperture 78.

What is claimed is:

1. A method of preserving an item, the method comprising the steps of:
   providing a sealable bag comprising at least one flexible panel comprising at least one permeable inner layer and an impermeable outer layer affixed together so as to provide a plurality of cavities, the cavities being arranged in a pattern across the flexible panel, a plurality of the cavities containing sorbent material, and wherein the flexible panel further comprises an impermeable inner layer affixed to the impermeable outer layer and disposed on the opposite side of the at least one permeable inner layer from the impermeable outer layer, wherein the impermeable inner layer separates the cavities from contents of the sealable bag;
   inserting an item to be preserved in the sealable bag;
   sealing the bag;
   introducing pacifying gas into the bag; and
   manually rupturing the impermeable inner layer to expose the cavities to the item in the sealed bag.

2. The method of preserving an item of claim 1, wherein the step of manually rupturing the impermeable inner layer comprises manually detaching the impermeable inner layer from the impermeable outer layer to expose the cavities to the item in the sealed bag.

3. The method of preserving an item of claim 1, further comprising the step of providing an aperture in the impermeable outer layer, and wherein the step of manually rupturing the impermeable inner layer uses the aperture.

4. The method of preserving an item of claim 3, further comprising the steps of:
   providing the impermeable outer layer with at least one first adhesive seal around the aperture;
   removably adhering the impermeable inner layer to the at least one first adhesive seal to seal the aperture of the impermeable outer layer; and
   manually rupturing the impermeable inner layer by manually detaching the impermeable inner layer from the first adhesive seal and pulling the impermeable inner layer out of the bag through the aperture.

5. The method of preserving an item of claim 4, further comprising the steps of:
   providing the impermeable outer layer with a second adhesive seal; and
   sealing the aperture of the impermeable outer layer using the second adhesive seal after pulling the impermeable inner layer out of the bag through the aperture.

* * * * *